(12) United States Patent
Desousa et al.

(10) Patent No.: US 12,410,337 B2
(45) Date of Patent: Sep. 9, 2025

(54) CROSSLINKED COATING COMPOSITIONS FOR PACKAGING ARTICLES SUCH AS FOOD AND BEVERAGE CONTAINERS

(71) Applicant: SWIMC LLC, Cleveland, OH (US)

(72) Inventors: Joseph D. Desousa, Pittsburgh, PA (US); Sebastien Gibanel, Givry (FR); Benjamin J. Webster, Pittsburgh, PA (US); Kailas B. Sawant, Mars, PA (US); Benoit Prouvost, Nantes (FR)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/630,948

(22) Filed: Apr. 9, 2024

(65) Prior Publication Data

US 2024/0352272 A1 Oct. 24, 2024

Related U.S. Application Data

(63) Continuation of application No. 17/978,854, filed on Nov. 1, 2022, now Pat. No. 11,981,822, which is a
(Continued)

(51) Int. Cl.
*C09D 109/10* (2006.01)
*B05D 1/02* (2006.01)
(Continued)

(52) U.S. Cl.
CPC ............. *C09D 109/10* (2013.01); *B05D 1/02* (2013.01); *B05D 3/007* (2013.01); *B05D 7/14* (2013.01);
(Continued)

(58) Field of Classification Search
CPC ........ C09D 109/10; C09D 5/022; C09D 7/65; B05D 1/02; B05D 3/007; B05D 7/14; B05D 7/227; B65D 1/165; B65D 25/14
See application file for complete search history.

(56) References Cited

U.S. PATENT DOCUMENTS 2,967,162 A 1/1961 Vasta
3,248,356 A 4/1966 Snyder
(Continued)

FOREIGN PATENT DOCUMENTS

CA 2066988 10/1992
CA 2758205 A1 10/2010
(Continued)

OTHER PUBLICATIONS

Decision to Refuse for EP 16880072.0 issued by the European Patent Office; Jul. 9, 2024;20 pgs.
(Continued)

*Primary Examiner* — Michael C Miggins
(74) *Attorney, Agent, or Firm* — Mueting Raasch Group

(57) ABSTRACT

A method of forming a coating on a food or beverage container, which includes spraying a coating composition onto an interior surface of the food or beverage container, where the coating composition includes a latex copolymer and a metal drier or crosslinking agent. The latex copolymer is a reaction product of monomers that include (a) one or more styrene-mimicking monomers containing one or more cyclic groups and one or more ethylenically-unsaturated groups, at least a portion of such styrene-mimicking monomers being polycyclic monomers containing ring unsaturation, and (b) one or more other ethylenically-unsaturated monomers. Preferably, the coating composition is substantially free of each of BPA, PVC, other halogenated monomers, and optionally styrene. The method may also include curing the sprayed coating composition, thereby providing the coating on the interior surface of the food or beverage container.

20 Claims, 2 Drawing Sheets

Related U.S. Application Data continuation of application No. 16/627,412, filed as application No. PCT/US2018/040546 on Jul. 2, 2018, now abandoned, which is a continuation of application No. 15/640,271, filed on Jun. 30, 2017, now Pat. No. 11,059,989, said application No. 17/978,854 is a continuation-in-part of application No. 17/723,030, filed on Apr. 18, 2022, which is a continuation of application No. 17/003,713, filed on Aug. 26, 2020, now Pat. No. 11,332,636, which is a continuation of application No. 15/539,366, filed as application No. PCT/US2015/000238 on Dec. 23, 2015, now Pat. No. 10,800,941, said application No. 17/978,854 is a continuation-in-part of application No. 17/194,953, filed on Mar. 8, 2021, now Pat. No. 11,725,067, which is a continuation of application No. 16/739,995, filed on Jan. 10, 2020, now Pat. No. 10,968,288, which is a continuation of application No. 15/539,280, filed as application No. PCT/US2015/000236 on Dec. 23, 2015, now Pat. No. 10,538,602.

(60) Provisional application No. 62/096,572, filed on Dec. 24, 2014, provisional application No. 62/096,573, filed on Dec. 24, 2014.

(51) Int. Cl.
  *B05D 3/00* (2006.01)
  *B05D 7/14* (2006.01)
  *B05D 7/22* (2006.01)
  *B65D 1/16* (2006.01)
  *B65D 25/14* (2006.01)
  *C09D 5/02* (2006.01)
  *C09D 7/65* (2018.01)

(52) U.S. Cl.
  CPC ............. *B65D 1/165* (2013.01); *B65D 25/14* (2013.01); *C09D 5/022* (2013.01); *C09D 7/65* (2018.01); *B05D 7/227* (2013.01); *B05D 2252/02* (2013.01); *B05D 2701/00* (2013.01); *Y10T 428/13* (2015.01); *Y10T 428/1352* (2015.01); *Y10T 428/1355* (2015.01); *Y10T 428/139* (2015.01); *Y10T 428/1397* (2015.01)

(56) References Cited

U.S. PATENT DOCUMENTS

| | | |
|---|---|---|
| 3,297,621 A | 1/1967 | Taft |
| 3,390,206 A | 6/1968 | Thompson et al. |
| 3,943,187 A | 3/1976 | Wu |
| 3,991,216 A | 11/1976 | Christenson et al. |
| 4,076,676 A | 2/1978 | Sommerfeld |
| 4,110,291 A | 8/1978 | Barbaras et al. |
| 4,129,712 A | 12/1978 | Balatan |
| 4,151,143 A | 4/1979 | Blank et al. |
| 4,199,622 A | 4/1980 | Kokumai et al. |
| 4,247,439 A | 1/1981 | Matthews et al. |
| 4,285,847 A | 8/1981 | Ting |
| 4,289,674 A | 9/1981 | Christenson et al. |
| 4,305,859 A | 12/1981 | McEwan et al. |
| 4,329,401 A | 5/1982 | Talsma et al. |
| 4,413,015 A | 11/1983 | Anderson et al. |
| 4,446,258 A | 5/1984 | Chu et al. |
| 4,487,859 A | 12/1984 | Martino |
| 4,522,961 A | 6/1985 | Martino et al. |
| 4,560,714 A | 12/1985 | Gajria et al. |
| 4,567,246 A | 1/1986 | Gajria et al. |
| 4,647,612 A | 3/1987 | Ranka et al. |
| 4,692,491 A | 9/1987 | Ranka et al. |
| 4,871,810 A | 10/1989 | Saltman |
| 4,894,397 A | 1/1990 | Morgan et al. |
| 4,898,911 A | 2/1990 | Miyashita et al. |
| 4,906,684 A | 3/1990 | Say |
| 4,948,834 A | 8/1990 | Baker et al. |
| 4,963,602 A | 10/1990 | Patel |
| 4,966,948 A * | 10/1990 | Godbey, Jr. ............... C08K 5/29 525/329.9 |
| 5,043,380 A | 8/1991 | Cole |
| 5,082,742 A | 1/1992 | Padwa |
| 5,157,078 A | 10/1992 | Woo et al. |
| 5,264,469 A | 11/1993 | Mysliwczyk et al. |
| 5,266,628 A | 11/1993 | Essary et al. |
| 5,296,525 A | 3/1994 | Spencer |
| 5,387,625 A | 2/1995 | Parekh et al. |
| 5,527,840 A | 6/1996 | Chutko et al. |
| 5,529,890 A | 6/1996 | McGuckin et al. |
| 5,539,073 A | 7/1996 | Taylor et al. |
| 5,629,376 A | 5/1997 | Sargent et al. |
| 5,686,140 A | 11/1997 | Stoffel |
| 5,714,539 A | 2/1998 | Perez et al. |
| 5,811,484 A | 9/1998 | Wilfinger et al. |
| 5,830,952 A | 11/1998 | Pedersen et al. |
| 5,922,817 A | 7/1999 | Pedersen et al. |
| 5,962,571 A | 10/1999 | Overbeek et al. |
| 6,008,273 A | 12/1999 | Leibelt et al. |
| 6,040,062 A | 3/2000 | McGee et al. |
| 6,197,878 B1 | 3/2001 | Murray et al. |
| 6,388,021 B1 | 5/2002 | Shibata et al. |
| 6,511,756 B1 | 1/2003 | Obuchi et al. |
| 6,852,821 B1 | 2/2005 | Bendix et al. |
| 7,037,584 B2 | 5/2006 | Wind et al. |
| 7,189,787 B2 | 3/2007 | O'Brien et al. |
| 7,303,797 B1 | 12/2007 | Barsotti et al. |
| 7,378,479 B2 | 5/2008 | Tamareselvy et al. |
| 7,592,047 B2 | 9/2009 | O'Brien et al. |
| 7,645,521 B2 | 1/2010 | Wevers et al. |
| 7,682,699 B2 | 3/2010 | Wind et al. |
| 7,858,162 B2 | 12/2010 | Fuhry et al. |
| 7,923,513 B2 | 4/2011 | Killilea et al. |
| 8,092,876 B2 | 1/2012 | O'Brien et al. |
| 8,142,868 B2 | 3/2012 | O'Brien et al. |
| 8,173,265 B2 | 5/2012 | O'Brien et al. |
| 8,367,171 B2 | 2/2013 | Stetson |
| 8,449,960 B2 | 5/2013 | Skillman et al. |
| 8,617,663 B2 | 12/2013 | O'Brien et al. |
| 8,835,012 B2 | 9/2014 | O'Brien et al. |
| 9,029,470 B2 | 5/2015 | Rademacher et al. |
| 9,163,151 B2 | 10/2015 | Lock et al. |
| 9,181,448 B2 | 11/2015 | Li et al. |
| 9,242,763 B2 | 1/2016 | O'Brien et al. |
| 9,394,456 B2 | 7/2016 | Rademacher et al. |
| 9,404,006 B2 | 8/2016 | Li |
| 9,409,219 B2 | 8/2016 | Niederst et al. |
| 9,415,900 B2 | 8/2016 | O'Brien et al. |
| 9,862,854 B2 | 1/2018 | O'Brien et al. |
| 10,538,602 B2 | 1/2020 | Gibanel et al. |
| 10,800,941 B2 | 10/2020 | Gibanel et al. |
| 10,968,288 B2 | 4/2021 | Gibanel et al. |
| 11,059,989 B2 | 7/2021 | DeSousa et al. |
| 11,332,636 B2 | 5/2022 | Gibanel et al. |
| 11,981,822 B2 | 5/2024 | DeSousa |
| 2002/0147270 A1 | 10/2002 | Kuo et al. |
| 2002/0155235 A1 | 10/2002 | Taylor et al. |
| 2002/0161108 A1 | 10/2002 | Schultz et al. |
| 2003/0064185 A1 | 4/2003 | Mazza et al. |
| 2003/0144446 A1 | 7/2003 | Lee |
| 2003/0187128 A1 | 10/2003 | Shiba et al. |
| 2004/0259989 A1 | 12/2004 | O'Brien et al. |
| 2005/0196629 A1 | 9/2005 | Bariatinsky et al. |
| 2005/0282957 A1 | 12/2005 | Parker et al. |
| 2006/0100366 A1 | 5/2006 | O'Brien et al. |
| 2007/0017440 A1 | 1/2007 | Tang et al. |
| 2007/0036903 A1 | 2/2007 | Mayr et al. |
| 2007/0117928 A1 | 5/2007 | O'Brien et al. |
| 2007/0281179 A1 | 12/2007 | Ambrose et al. |
| 2008/0299343 A1 | 12/2008 | Vogt et al. |
| 2010/0093913 A1 | 4/2010 | Jones et al. |
| 2010/0224510 A1 | 9/2010 | Ford et al. |
| 2010/0260954 A1 | 10/2010 | Stenson et al. |
| 2011/0195263 A1 | 8/2011 | Malotky et al. |

(56) References Cited

U.S. PATENT DOCUMENTS

| | | |
|---|---|---|
| 2011/0207850 A1 | 8/2011 | Kan et al. |
| 2011/0290696 A1 | 12/2011 | Stenson et al. |
| 2012/0145721 A1 | 6/2012 | Cavallin et al. |
| 2012/0171470 A1 | 7/2012 | Cavallin et al. |
| 2012/0177855 A1 | 7/2012 | Cavallin et al. |
| 2013/0052381 A1 | 2/2013 | Gallucci et al. |
| 2013/0280454 A1 | 10/2013 | Telford et al. |
| 2013/0281574 A1 | 10/2013 | Li |
| 2013/0316109 A1 | 11/2013 | Niederst et al. |
| 2014/0323640 A1 | 10/2014 | Lock et al. |
| 2014/0329954 A1 | 11/2014 | Craun et al. |
| 2015/0017359 A1 | 1/2015 | Singer et al. |
| 2015/0147502 A1 | 5/2015 | Lindenmuth |
| 2015/0218407 A1 | 8/2015 | Bao et al. |
| 2015/0225600 A1 | 8/2015 | Cunningham et al. |
| 2016/0009941 A1 | 1/2016 | Rademacher |
| 2016/0024325 A1 | 1/2016 | Li |
| 2016/0122581 A1 | 5/2016 | You et al. |
| 2016/0376446 A1 | 12/2016 | Gibanel et al. |
| 2017/0002227 A1 | 1/2017 | Gibanel et al. |
| 2017/0009111 A1 | 1/2017 | Bauer et al. |
| 2017/0369603 A1 | 12/2017 | Gibanel et al. |
| 2018/0265729 A1 | 9/2018 | Gibanel et al. |
| 2019/0002724 A1 | 1/2019 | DeSousa et al. |
| 2019/0249029 A1 | 8/2019 | Gibanel et al. |
| 2020/0056066 A1 | 2/2020 | Gibanel et al. |
| 2020/0148795 A1 | 5/2020 | Gibanel et al. |
| 2020/0148908 A1 | 5/2020 | DeSousa et al. |
| 2020/0231837 A1 | 7/2020 | Gibanel et al. |
| 2020/0385601 A1 | 12/2020 | Gibanel et al. |
| 2020/0392366 A1 | 12/2020 | Gibanel et al. |
| 2021/0261696 A1 | 8/2021 | Gibanel et al. |
| 2022/0315789 A1 | 10/2022 | Gibanel et al. |
| 2023/0159783 A1 | 5/2023 | DeSousa et al. |

FOREIGN PATENT DOCUMENTS

| | | |
|---|---|---|
| CN | 1636043 A | 7/2005 |
| CN | 10703432 A | 11/2005 |
| CN | 102712722 A | 10/2012 |
| CN | 102906144 A | 1/2013 |
| CN | 103282450 A | 9/2013 |
| CN | 107690456 A | 5/2016 |
| CN | 106164113 A | 11/2016 |
| CN | 107683311 A | 2/2018 |
| DE | 10225367 | 9/2003 |
| EP | 0114478 A1 | 8/1984 |
| EP | 0705852 A1 | 4/1996 |
| EP | 0838537 A1 | 4/1998 |
| EP | 1371689 B1 | 12/2003 |
| EP | 1049748 B1 | 1/2007 |
| EP | 1908798 | 4/2008 |
| EP | 2009034 | 12/2008 |
| EP | 2033992 | 3/2009 |
| EP | 3529310 B1 | 12/2021 |
| GB | 1100569 | 1/1968 |
| GB | 1555868 | 11/1979 |
| GB | 1574721 | 9/1980 |
| GB | 2287469 A | 9/1995 |
| JP | S5216490 | 5/1977 |
| JP | 5339387 | 4/1978 |
| JP | 58185604 | 10/1983 |
| JP | 2-232219 | 9/1990 |
| JP | H0543830 | 2/1993 |
| JP | H07-228834 A | 8/1995 |
| JP | H09-025436 A | 1/1997 |
| JP | 2000080212 | 3/2000 |
| JP | 2002138245 | 5/2002 |
| JP | 2002155234 | 5/2002 |
| JP | 2004250505 | 9/2004 |
| JP | 4683515 B2 | 5/2011 |
| KR | 960010816 A | 4/1996 |
| RU | 2076109 | 3/1997 |
| RU | 2133756 | 7/1999 |
| SU | 653266 | 3/1979 |
| WO | WO 89/12618 A1 | 12/1989 |
| WO | WO 94/26789 A1 | 11/1994 |
| WO | WO 97/23516 A1 | 7/1997 |
| WO | WO 99/20676 A1 | 4/1999 |
| WO | WO 00/12625 A1 | 3/2000 |
| WO | WO 00/49072 | 8/2000 |
| WO | WO 01/23471 | 4/2001 |
| WO | WO 02/064691 | 8/2002 |
| WO | WO 03/010254 A2 | 2/2003 |
| WO | WO 2004/090020 | 10/2004 |
| WO | WO 2005/080517 | 9/2005 |
| WO | WO 2006/045017 | 4/2006 |
| WO | WO 2007/123659 | 11/2007 |
| WO | WO 2007/138111 | 12/2007 |
| WO | WO 2008/036629 | 3/2008 |
| WO | WO 2009/137014 | 11/2009 |
| WO | WO 2010/019180 | 2/2010 |
| WO | WO 2010/062844 | 6/2010 |
| WO | WO 2010/068433 A1 | 6/2010 |
| WO | WO 2010/097353 | 9/2010 |
| WO | WO 2010/100121 | 9/2010 |
| WO | WO 2010/100122 | 9/2010 |
| WO | WO 2010/114648 | 10/2010 |
| WO | WO 2010/118356 | 10/2010 |
| WO | WO 2010/125032 A1 | 11/2010 |
| WO | WO 2011/009024 | 1/2011 |
| WO | WO 2011/011705 | 1/2011 |
| WO | WO 2011/011707 | 1/2011 |
| WO | WO 2011/057781 A2 | 5/2011 |
| WO | WO 2011/068930 | 6/2011 |
| WO | WO 2011/149449 A1 | 12/2011 |
| WO | WO 2012/089746 | 7/2012 |
| WO | WO 2012/089747 | 7/2012 |
| WO | WO 2012/108874 A1 | 8/2012 |
| WO | WO 2013/098218 A1 | 7/2013 |
| WO | WO 2013/191826 A1 | 12/2013 |
| WO | WO 2014/089410 | 6/2014 |
| WO | WO 2014/139971 | 9/2014 |
| WO | WO 2014/139973 A1 | 9/2014 |
| WO | WO 2014/140057 A1 | 9/2014 |
| WO | WO 2014/186285 | 11/2014 |
| WO | WO 2015/002958 | 1/2015 |
| WO | WO 2015/002961 | 1/2015 |
| WO | WO 2016/105502 | 6/2016 |
| WO | WO 2016/105504 | 6/2016 |
| WO | WO 2016/196174 | 12/2016 |
| WO | WO 2016/196190 | 12/2016 |
| WO | WO 2017/112837 | 6/2017 |
| WO | WO 2017/180895 | 10/2017 |
| WO | WO 2018/013766 | 1/2018 |
| WO | WO 2018/075762 | 4/2018 |
| WO | WO 2018/085052 | 5/2018 |
| WO | WO 2018/085052 A1 | 5/2018 |
| WO | WO 2019/006444 | 1/2019 |
| WO | WO 2019/046700 | 3/2019 |
| WO | WO 2019/046750 | 3/2019 |
| WO | WO 2019/241209 | 12/2019 |
| WO | WO 2022/147004 | 7/2022 |

OTHER PUBLICATIONS

Minutes from Oral Hearing for EP 16880072.0 issued by the European Patent Office; Jul. 4, 2024; 10 pgs.

"Aerosol® Surfactants—Specialty Additives," Woodland Park, NJ, 12 pages, Cytec Solvay Group, (2015).

Australian Examination Report No. 1 for Application No. 2015371311, date of report Jul. 24, 2019.

BASF Group, "Dihydrodicyclopentadienyl Acrylate (DCPA)" Technical Information TI/CP 1424 e, Petrochemicals Specialty Monomers, Jun. 2016, 2 pages.

Chinese Patent Application No. 201880053457.5, Search Report from First Office Action issued Dec. 13, 2021, 5 pages including English translation.

Calbo, Ed., Translated by Zhu et al.; "Handbook of Coatings Additives", Shanghai Scientific and Technological Literature Publishing House, May 31, 2000, Cover, title page, publishing information, preface, table of contents, pp. 176-179. Translation provided of relevant text from p. 177.

(56) References Cited

OTHER PUBLICATIONS

"D1a—Calculations for Selected Examples of D1" (D1 is WO 2012/089746 A1, previously cited), Notice of opposition to a European patent, filed May 30, 2023 in European Patent 3741818, 1 page.
Diehl et al., "Waterborne Mechanical Dispersions of Polyolefins", The Dow Chemical Company, Jan. 24, 2009, pp. 1-14.
"E1—Viscosity Conversion Table", Other Evidence, Notice of opposition to a European patent, filed May 30, 2023 in European Patent 3741818, 1 page.
"Empimin OP 70," Socium Di-Octyl Suplhosuccinate, 3 pages, Huntsman, Saint-Mihiel, France, (2006).
English language translation for Japanese Laid-open Publication No. 5339387 (publication date Apr. 11, 1978). 19 pages.
English translation of Chinese OA dated Feb. 7, 2013 for Chinese Application No. CN201080008007.8, 8 pages.
European Patent 3529310 granted Dec. 8, 2021 (Application No. EP 17867591.4 filed Oct. 19, 2017), Notice of Opposition to a European patent filed Sep. 5, 2022, Opponent: Akzo Nobel Coatings International B.V., 14 pages.
European Patent 3529310 granted Dec. 8, 2021 (Application No. EP 17867591.4 filed Oct. 19, 2017), Notice of Opposition to a European patent filed Sep. 8, 2022, Opponent: PPG Industries, Inc., 37 pages.
European Patent 3741818 granted Aug. 31, 2022 (Application No. EP 20178787.6 filed Jun. 8, 2020), Notice of opposition to a European patent, filed May 30, 2023, Opponent: PPG Industries, Inc., 47 pages.
European Patent 3529310 granted Dec. 8, 2021 (Application No. EP 17867591.4 filed Oct. 19, 2017), Consolidated List of References during Opposition, issued Feb. 1, 2023, 1 page.
European Patent Application No. 15 87 3784.1, filed Dec. 23, 2015, Extended European Search Report, issued Jul. 19, 2018, 7 pages.
European Patent No. 3645175 B1, granted on Nov. 23, 2022 (EP Application No. 188230106.3 on Jul. 7, 2018), Notice of Opposition Grounds, Facts, and Arguments, Proprietor: SWIMC LLC, Opponent: PPG Industries, Inc., dated Aug. 22, 2023; 18 pgs.
European Patent Application No. 16 88 0072.0, filed Jul. 23, 2018, Supplementary European Search Report, issued Sep. 17, 2019, 6 pages.
European Search Report for EP Application No. 15873785.8, dated May 11, 2018.
Extended European Search Report, Supplementary European Search Report and Search Opinion, dated Mar. 2, 2021, for EP Application No. 18823016.3, 7 pages.
Fendler and Dékány, Eds., "Nanoparticles in Solids and Solutions," Nato ASI Series, Kluwer Academic Publishers, 1996, Cover page, title page, copyright p. and pp. 265-266.
Glycosperse ®L-20, Polysorbate 20, POE (20) Sorbitan Monolaurate. CAS No. 68154-33-6, 2 pages, LONZA, (2010).
Glycosperse™ L-20 KFG, Polysorbate 20, POE (Sorbitan Monolaurate), CAS No. 9005-64-5, 2 pages, LONZA, (2013).
Good, "Chapter 17: Recent Advances in Metal Can Interior Coatings", 1988, Food and Packaging Interactions; Hotchkiss, ed., ACS Symposium Series, American Chemical Society, Washington D.C., 14 pages.
Gu, "The Quality of the Film and Treatments of Inside Spray Coating for Food Can", Dec. 30, 2012, Packaging and Food Machinery, 30(6):67-70. With English Abstract. Translation of Chinese Search Report provided for relevance.
"Guidance for Industry: Preparation of Premarket Submissions for Food Contact Substances (Chemistry Recommendations)," Office of Food Additive and Safety, Food and Drug Administration, FDA Docket No. FDA-2013-S-0610, Dec. 2007. Online [retrieved Nov. 9, 2020]. Retrieved from the Internet:<URL:https://www.regulations.gov/docket?D=FDA-2013-S-0610>; 23 pgs.
Howard et al., "Dictionary of Chemical Names and Synonyms", Lewis Publishers, © 1992, 3 pages.

International Search Report and Written Opinion for International Application No. PCT/EP2010/052174 dated Jun. 15, 2010, 13 pages.
International Search Report for International Application No. PCT/US2015/000236 date mailed Apr. 10, 2016.
International Search Report for International Application No. PCT/US2015/000238 date mailed May 16, 2016, 5 pages.
International Search Report for International Application No. PCT/US2016/068180 date mailed Mar. 21, 2017, 3 pages.
International Search Report for International Application No. PCT/US2017/041858 date mailed Oct. 10, 2017, 4 pages.
International Search Report for International Application No. PCT/US2018/0040546 date mailed Sep. 19, 2018, 3 pages.
International Standard ASTM D1957-86 (Reapproved 2001), "Standard Test Method for Hydroxyl Value of Fatty Oils and Acids," 3 pages.
International Standard ASTM D1200-88, (1988), "Standard Test Method for Viscosity by Ford Viscosity Cup," 3 pages.
International Standard ASTM D 3359-17, (2017), "Standard Test Methods for Rating Adhesion by Tape Test," 9 pages.
International Standard ASTM D4752-10, "Standard Practice for Measuring MEK Resistance of Ethyl Silicate (Inorganic) Zinc-Rich Primers by Solvent Rub1", 2010, 8 pages.
International Preliminary Report on Patentability dated May 30, 2011 for International Application No. PCT/EP2010/052174, 7 pages.
International Preliminary Report on Patentability for International Application No. PCT/US2015/000236 mailed Jun. 27, 2017.
International Preliminary Report on Patentability for International Application No. PCT/US2015/000238 mailed Jul. 6, 2017, 7 pages.
International Preliminary Report on Patentability for International Application No. PCT/US2016/068180 mailed Jun. 26, 2018, 8 pages.
International Preliminary Report on Patentability for International Application No. PCT/US2017/041858 mailed Jan. 15, 2019, 7 pages.
International Preliminary Report on Patentability for International Application No. PCT/US2018/040546 mailed Dec. 31, 2019, 6 pages.
Larrañaga, et al., "Hawley's Condensed Chemical Dictionary, Sixteenth Edition", 2016, John Wiley & Sons, Inc., Hoboken, New Jersey, Title pages, copyright page, table of contents, p. 814, and information page.
Lawson, "Waterborne Spray Can Coatings", 1978, *Modern Container Coatings*, Strand, ed., ACS Symposium Series, American Chemical Society, Washington D.C., 3 pages.
Levy, et al., *The Organic Chemistry of Sugars*, 2006, Taylor & Francis Group, CRC Press, Title page, copyright page, pp. 227-231.
Men'Shikova et al., "Synthesis of Carbonxylated Monodisperse Latexes and Their Self-Organization in Thin Films," Russian J. of Applied Chem., vol. 78, No. 1 (2005), pp. 159-165.
Mishra et al., "Synthesis and characterization of butyl acrylate/methyl methacrylate/glycidyl methacrylate latexes," J. of Applied Polymer Science, vol. 115 (2010), pp. 549-557. Abstract provided.
Norakankorn et al., "Synthesis of core/shell structure of glycidyl-functionalized poly (methylmethacrylate) latex nanoparticles via a differential microemulsion polymerization," European Polymer J., 45 (2009), pp. 2977-2986. Abstract provided.
Office Action and Search Report dated Mar. 27, 2019 for Chinese Patent Application No. 201580070922.2, with English translation; 17 pages.
Office Action and Search Report dated Sep. 26, 2019 for Indian Patent Application No. 20177022748; 8 pages.
Polymerizable Surfactants, Montello Inc., retrieved on Feb. 4, 2015. http://www.montelloinc.com/polymerizable_surfactants2.htm, 3 pages.
Polystep® B-1, Stepan Company retrieved from http://www.stepan.com/products/Surfactants/POLYSTEP%C2%AE/POLYSTEP%C2%AE-B-1.aspx, ©2012, 4 pages.
Product Guide, "Liquid Coating Resins, Asia Pacific", 2006, Cytec Surfaces Specialties, Inc., 15 pages.
Product Information Bulletin, "Can coatings based on Epikote resins", Sep. 1991, Shell Chemicals, 2 pages.

(56) References Cited

OTHER PUBLICATIONS

Product Information Sheet, "Phenolic Crosslinkers Product Guide—Phenodur® Resins—Worldwide", 2017, allnex GMBH, Frankfurt am Main, Germany, 7 pages.

Sigma-Aldrich, "Diocyl sulfosuccinate sodium salt," Jan. 15, 2019, 4 pages. https://www.sigmaaldrich.com/catalog/product/aldrich/323586?lang=en&region=US.

"Specialty Additives AEROSOL® Surfactants," 12 pages, Oct. 2013, CYTEC.

Stanssens, et al., "On the mechanism of the esterification of a β-hydroxy alkylamide with a carboxylic acid", 1993, *Progress in Organic Coatings*, 22:379-391.

Stepan, Emulsion Polymerization, Product Bulletin, Nov. 2009, 2 pages.

Thailand Office Action for Thailand Patent Application No. 1701003636 dated Oct. 31, 2017, 3 pages.

U.S. National Library of Medicine, Agent Name Docusate sodium, CAS No. 577-11-7. Formula C20-H38-O7-S.Na. 2 pages. Oct. 2018.

Wang et al., "Mechanism of Emulsion Polymerization of Styrene Using a Reactive Surfactant," Journal of Polymer Science Part A: Polymer Chemistry, vol. 39, Issue 18, 3 pages, Wiley Online Library, Sep. 15, 2001.

White paper, "Overview of Glass Transition Analysis by Differential Scanning Calorimetry (TA443)", Ta Instruments. No publication date available, received on Sep. 8, 2022.

Summons to Attend Oral Proceedings Pursuant to Rule 115(1) EPC, including summary of facts, consolidated list from the Opposition Division of the European Patent Office for EP Application No. 20178787.6, Jan. 29, 2024; 15 pgs.

Response to Preliminary Opinion for Opposition Against EP3645175, submission by the Opponent PPG Industries, Inc. on Feb. 7, 2025; 19 pgs.

\* cited by examiner

CROSSLINKED COATING COMPOSITIONS FOR PACKAGING ARTICLES SUCH AS FOOD AND BEVERAGE CONTAINERS

RELATED APPLICATIONS

The present application is a continuation of U.S. patent application Ser. No. 17/978,854, filed Nov. 1, 2022 which is a continuation of U.S. patent application Ser. No. 16/627,412 filed Dec. 30, 2019, which is a § 371 U.S. National Stage of International Application No. PCT/US2018/040546 filed Jul. 2, 2018, which is a continuation of U.S. patent application Ser. No. 15/640,271 filed Jun. 30, 2017, and issued as U.S. Pat. No. 11,059,989 on Jul. 13, 2021. The present application is also a continuation-in-part of U.S. patent application Ser. No. 17/723,030 filed Apr. 18, 2022, which is a continuation of U.S. patent application Ser. No. 17/003,713 filed Aug. 26, 2020 and issued as U.S. Pat. No. 11,332,636 on May 17, 2022, which is a continuation of U.S. patent application Ser. No. 15/539,366 filed Jun. 23, 2017 and issued as U.S. Pat. No. 10,800,941 on Oct. 13, 2020, which is a § 371 U.S. National Stage of International Application No. PCT/US2015/000238 filed Dec. 23, 2015, which claims the benefit of U.S. Provisional Application No. 62/096,572 filed Dec. 24, 2014. The present application is also a continuation-in-part of U.S. patent application Ser. No. 17/194,953 filed Mar. 8, 2021 and issued as U.S. Pat. No. 11,725,067, which is a continuation of U.S. patent application Ser. No. 16/739,995 filed Jan. 10, 2020 and issued as U.S. Pat. No. 10,968,288 on Apr. 6, 2021, which is a continuation of U.S. patent application Ser. No. 15/539,280 filed Jun. 23, 2017 and issued as U.S. patent Ser. No. 10/538,602 on Jan. 21, 2020, which is § 371 U.S. National Stage of International Application No. PCT/US2015/000236 filed Dec. 23, 2015, which claims the benefit of U.S. Provisional Application No. 62/096,573 filed Dec. 24, 2014. All of the above-listed applications are hereby incorporated by reference in their entireties.

FIELD

The present disclosure is directed to coating compositions. In particular, the present disclosure is directed to latex emulsion or solution polymerized coating compositions, such as for forming coatings (e.g., spray coatings) for food and beverage containers, as well as other packaging articles.

BACKGROUND

A wide variety of coatings have been used to coat the surfaces of packaging articles (e.g., food and beverage cans). For example, metal cans are sometimes coated using "coil coating" or "sheet coating" operations, viz., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed or partially formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, have sufficient flexibility to withstand deflection of the underlying substrate without rupturing (e.g., during fabrication steps or damage occurring during transport or use of the packaging article), and resist degradation over long periods of time, even when exposed to harsh environments.

Many current packaging coatings contain mobile or bound bisphenol A ("BPA"), aromatic glycidyl ether compounds based on BPA or other bisphenols, polyvinyl chloride ("PVC"), or styrene. Although the balance of scientific evidence available to date indicates that the small trace amounts of these compounds that might be released from existing coatings does not pose any health risks to humans, these compounds are nevertheless perceived by some people as being potentially harmful to human health. From the foregoing, it will be appreciated that what is needed in the art is a packaging container (e.g., a food or beverage can or a portion thereof) that is coated with a composition that does not contain extractible quantities of such compounds.

SUMMARY

An aspect of the present disclosure is directed to a method of forming a coating on a packaging article, such as a food or beverage container. The method includes applying a coating composition using any suitable technique to a substrate (typically a metal substrate) prior to or after forming the substrate into a food or beverage container or a portion thereof. The coating composition may be used to form either an exterior coating or an interior coating.

In a preferred embodiment, the coating composition is spray applied onto an interior surface of a food or beverage container. The coating composition includes a self-crosslinkable or crosslinkable acrylic copolymer, such as an emulsion-polymerized latex copolymer or a solution-polymerized acrylic copolymer, dispersed in an aqueous or solvent carrier and mixed with one or both of a metal drier or crosslinking agent, wherein the acrylic copolymer is a reaction product of monomers that include (a) one or more styrene-offset or styrene-mimicking monomers containing one or more cyclic groups and one or more ethylenically-unsaturated groups, at least a portion of such styrene-mimicking monomers being polycyclic monomers containing ring unsaturation, and (b) one or more other ethylenically-unsaturated monomers. In one embodiment, the acrylic copolymer becomes crosslinked by reacting with itself in the presence of the metal drier. In another embodiment, the acrylic copolymer becomes crosslinked by reacting with the crosslinking agent. In yet another embodiment, the acrylic coating composition comprises a composition that includes an aqueous dispersion comprising a reaction product of monomers that include (a) one or more styrene-mimicking monomers containing one or more cyclic groups and one or more ethylenically-unsaturated groups, at least a portion of such styrene-mimicking monomers containing ring unsaturation, and (b) one or more other ethylenically-unsaturated monomers, and optionally other components such as a base, crosslinking agents, and the like, which behave similar to systems described in U.S. Pat. No. 7,189,787 and U.S. Patent Application Publication No. 2015/0218407, both of which are incorporated herein by reference in their entireties.

In preferred embodiments, the monomers used to produce the acrylic copolymer are substantially free of each of BPA, halogenated materials such as those contained in PVC, and other halogenated monomers, and optionally styrene. In some further preferred embodiments, the monomers used to produce the acrylic copolymer are substantially free of oxirane groups. In some further preferred embodiments, the polycyclic styrene-mimicking monomer(s) include a bridged structure.

Without intending to be bound by theory, the above-mentioned polycyclic styrene-mimicking monomers containing ring unsaturation are believed to impart enhanced reactivity to the acrylic copolymer in the above-mentioned crosslinking reactions.

In some embodiments, the disclosed styrene-mimicking monomers also include other ethylenically-unsaturated, cyclic-group containing monomers that can provide useful properties (e.g., enhanced Tg or enhanced chemical resistance) in acrylic copolymers made without styrene, or with reduced levels of styrene, but which are not believed to impart significantly improved reactivity to the acrylic copolymer in a crosslinking reaction, including (i) ethylenically-unsaturated monomers having a saturated monocyclic group with a ring structure having 3-5 atoms in the ring, (ii) styrene-mimicking ethylenically-unsaturated monomers, other than styrene, having a saturated monocyclic group with 6 or more atoms in the ring (e.g., benzyl (meth)acrylate or cyclohexyl (meth)acrylate), (iii) ethylenically-unsaturated monomers having a saturated polycyclic group, or (iv) combinations thereof.

In another aspect, the invention provides a self-crosslinkable or crosslinkable acrylic copolymer, such as an emulsion-polymerized latex copolymer or solution-polymerized acrylic copolymer, dispersed in a liquid carrier, such as an organic solvent or an aqueous carrier and mixed with one or both of a metal drier or crosslinking agent, wherein the acrylic copolymer is a reaction product of monomers that include (a) one or more styrene-mimicking monomers containing one or more cyclic groups and one or more ethylenically-unsaturated groups, at least a portion of such styrene-mimicking monomers being polycyclic monomers containing ring unsaturation, and (b) one or more other ethylenically-unsaturated monomers.

Definitions

Unless otherwise specified, the following terms as used herein have the meanings provided below:

Substitution is permitted on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety. A group or moiety that may be the same or different as other groups or moieties is referred to as being an "independent" or "independently" such a group or moiety.

The terms "a", "an", "the", "at least one," and "one or more" are used interchangeably. Thus, for example, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc.).

The term "about" is used herein with respect to measurable values and ranges due to expected variations known to those skilled in the art (e.g., limitations and variabilities in measurements).

The term "alicyclic group" refers to a cyclic organic group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (viz., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

The terms "comprises" and variations thereof do not have a limiting meaning where these terms appear in the description and claims.

The term "cyclic group" refers to a closed ring organic group that is classified as an alicyclic group or an aromatic group, both of which can include heteroatoms.

The term "ethylenically-unsaturated" when used in reference to a monomer or group refers to a carbon-carbon double or triple bond capable of participating in a polymerization reaction, and is not intended to encompass the carbon-carbon double bonds present in aryl groups such as, for example, the phenyl group of styrene, or aromatic double bonds in general.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "monomer" includes any reactant molecule used to produce a polymer, and encompasses both single-unit molecules (e.g., an acrylic molecule) and multi-unit molecules (e.g., an acrylic oligomer).

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "organic group" refers to a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

The term "polycyclic" when used in the context of a group refers to an organic group that includes at least two cyclic groups in which one or more atoms (and more typically two or more atoms) are present in the rings of both of the at least two cyclic groups. Thus, for example, a group that consists of two cyclohexane groups connected by a single methylene group is not a polycyclic group.

The term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyester-acrylic copolymers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

The term "tricyclic group" refers to a polycyclic group that includes three cyclic groups in which the ring of each cyclic group shares one or more atoms with one or both of the rings of the other cyclic groups.

The recitations herein of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Figure 1:
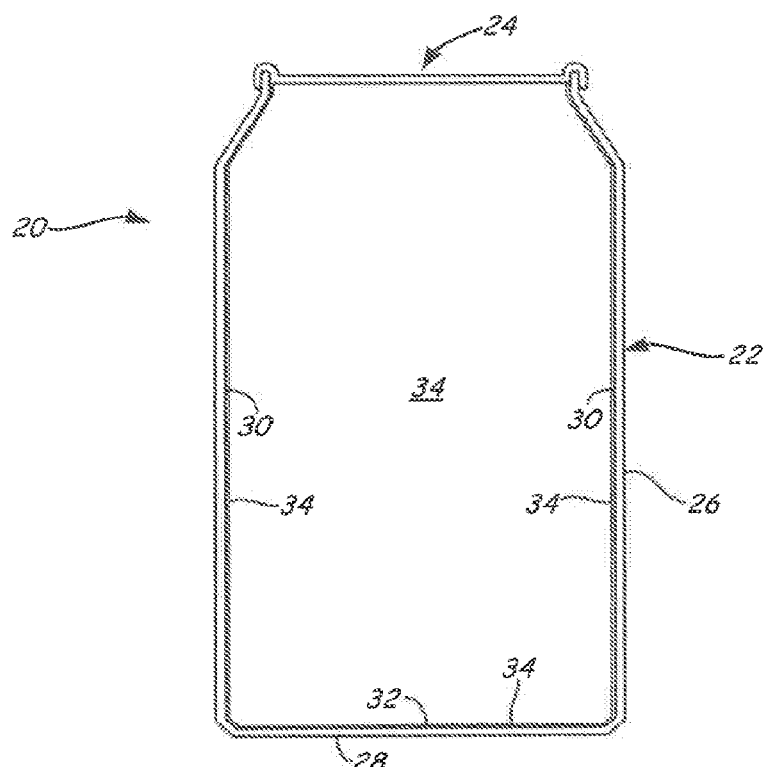
FIG. 1 is a schematic illustration of a two-piece food or beverage container having a coating formed from the coating composition of the present disclosure.

The present disclosure is directed to a coating composition formulated from an acrylic copolymer dispersed in a liquid carrier, such as a latex emulsion that, in preferred embodiments, is substantially free or completely free of each of BPA, PVC, and other halogenated monomers, and optionally styrene, and has a suitable glass transition temperature Tg (e.g., greater than about 40° C.) for reduced flavor scalping. For purposes of efficiency, the coating compositions discussed infra are referred to a "latex emulsion"; however, one of ordinary skill in the art would recognizes that the latex emulsion can instead comprises an acrylic copolymer dispersed in a liquid carrier, such as an organic solvent or an aqueous carrier, and can alternatively include an aqueous dispersion of a reaction product which is at least partially hydrophobic, and behave similar to the systems described in U.S. Pat. No. 7,189,787 and U.S. Patent Application Publication No. 2015/0218407, both of which are incorporated by reference in their entireties.

As discussed below, the latex emulsion is preferably produced from monomers that include one or more "styrene-offset" or "styrene-mimicking" or high glass transition temperature monomers, which preferably contribute in latex copolymers made without styrene, or made with reduced levels of styrene, to higher glass transition temperature or chemical resistance, and also preferably to increased adhesion to metal substrates. As such, the coating composition is particularly suitable for use in interior food-contact coating applications, including spray coating applications to coat interior surfaces of containers, including portions thereof, such as for use in packaging food and beverage products. It should be understood however that the disclosed latex copolymers and coating compositions may be made using styrene, and that the disclosed styrene-mimicking monomers can provide advantages in both styrene-free and styrene-containing compositions, for example by providing an improvement in crosslinking characteristics. "Styrene-mimicking" characteristics can include one or more performance characteristics of the final coating composition that are substantially equal to or enhanced compared to the performance characteristics of a final coating compositions using styrene-based monomers in place of the "styrene-mimicking" monomers.

The latex emulsion of the coating composition may include a liquid carrier such as an aqueous carrier (with or without organic solvents) or a solvent carrier) and particles of a latex copolymer that is polymerized in one or more emulsion polymerization steps. The latex emulsion may optionally be further formulated or modified, such as, for example, for inside-spray coating applications. The resulting coating composition may then be spray applied on an interior metal surface of a formed or partially-formed container (e.g., a food or beverage container). The applied coating composition may then be cured on the interior metal surface to produce a protective interior coating. Alternatively, the coating composition may be applied on an interior or exterior surface using any suitable coating technique (e.g., roll coating, wash coating, dip coating, etc.) prior to or after forming the substrate to be coated into a food or beverage container or a portion thereof.

During the emulsion polymerization to produce the latex copolymer, reactant monomers may be dispersed or otherwise suspended in an aqueous carrier, optionally with the use of one or more external surfactants. The reactant monomers may include a mixture of compounds capable of polymerizing under free radical-initiated, emulsion polymerization conditions, such as monomers having ethylenically-unsaturated groups.

The reactant monomers include two or more ethylenically-unsaturated monomers, where at least a portion of the ethylenically-unsaturated monomers are polycyclic styrene-mimicking monomers containing ring unsaturation and including at least one ethylenically-unsaturated group that is not located between ring atoms of a polycyclic group, such as a vinylic group or vinylic double bond. As used herein, the recited portion is determined based on the weight of such polycyclic styrene-mimicking monomers compared to the total weight of the ethylenically-unsaturated reactant monomers, viz., the total weight of all monomers that are polymerized and unreacted to produce the latex copolymer with covalent bonds.

The ethylenically-unsaturated monomers may each include one or more ethylenically-unsaturated groups. This allows the monomers to polymerize with each other to form copolymer chains, which may be linear or branched. Additionally, in some embodiments, a portion of the ethylenically-unsaturated monomers preferably have two or more ethylenically-unsaturated groups. These monomers may react to form interconnecting linkages between the copolymer chains (or as growth sites for the copolymer chains). The resulting latex copolymer can be provided as copolymer particles dispersed in the aqueous carrier.

A variety of styrene-mimicking monomers may be used to form the disclosed latex copolymers. As discussed above, the styrene-mimicking monomers include polycyclic monomers. Monomers that are at least bicyclic (e.g., bicyclic, tricyclic, or higher order polycyclic groups), and more preferably monomers that are bicyclic, represent preferred polycyclic monomers. The at least bicyclic groups will typically include from 5 to 30 carbon atoms, more typically from 6 to 15 carbon atoms, and even more typically from 7 to 10 carbon atoms. The at least bicyclic groups may include one or more heteroatoms (e.g., N, O, S, etc.) in place of one or more of the aforementioned carbon atoms. In addition to the polycyclic monomers, the reactant monomers can include monocyclic monomers.

As also discussed above, polycyclic styrene-mimicking monomers containing ring unsaturation are believed to impart enhanced reactivity to the latex copolymer in the above-mentioned crosslinking reactions. While not intending to be bound by theory, the carbon-carbon double bonds present in unsaturated bicyclic groups, such as in norbornene, may contribute to such enhanced reactivity towards crosslinking by increasing the level of ring strain. Bridging, when present, may further enhance ring strain and reactivity towards crosslinking. Expressed more generally, enhanced crosslinking reactivity may be found in polycyclic styrene-mimicking monomers having ring strain greater than that found in a cyclohexene group, and more preferably in monomers having ring strain approaching or exceeding that of a norbornene group. While the ring strain present in such monomers may be less than that found in some unsaturated bicyclic groups, it may be sufficient for certain packaging end uses. Non-limiting examples of strained ring groups of interest include the following ring groups and their appropriately substituted (e.g., pendant with ethylenically-unsaturated groups) variants: cyclopropene (e.g., 1,2 dimethylcyclopropene), cyclobutene, trans-cyclooctene, trans-cyclononene, cyclobutadiene, cyclopentadiene, 1,3-cyclohexadiene, 1,3-cycloheptadiene, 1,3 cyclooctadiene, 1,3 cyclononadiene, 1,3-cyclodecadiene, and derivatives and combinations thereof. By way of example, a cyclohexene group is not typically considered to be a strained ring group. In the context of monocyclic ring systems, rings including 3 to 5 atoms, and especially 3 or 4 atoms, tend to exhibit the greatest total ring strain. Examples of such strained monocylic ring systems are included in the above list.

In some embodiments, preferred unsaturated strained ring groups will have at least one double bond with a heat of hydrogenation greater than that of cyclohexene. In certain embodiments, the ring group (and preferably a carbon-carbon double bond of the ring group) will have a heat of hydrogenation at least about as high as that of bicyclo[2.2.2]octene (e.g., −28.25 kcal/mole), and more preferably, at least about as high as that of bicyclo[2.2.1]heptene (e.g., −33.13 kcal/mole). As used herein, when a heat of hydrogenation is stated to be, for example, "at least X," "greater than X," or the like, it should be understood that reference is made to the absolute value of the heat of hydrogenation. Heats of hydrogenation are typically reported as negative values, with a larger negative value indicating a higher heat of hydrogenation (e.g., −40 kcal/mole is a higher heat of hydrogenation than −10 kcal/mole).

It is also contemplated that the carbon-carbon double bonds in the above-mentioned ethylenically-unsaturated groups which are not located between ring atoms of a polycyclic group may have a comparable heat of hydrogenation, for example, a heat of hydrogenation greater than that of cyclohexene or (ii) at least about as high as that of bicyclo[2.2.2]octene. Preferred such carbon-carbon double bonds will be capable of reacting under the coating cure conditions described herein with a suitable crosslinker, such as for, example a resole phenolic crosslinker, to form a covalent linkage between the polymer and itself or between the polymer and the crosslinker.

Preferred styrene-mimicking monomers include ethylenically-unsaturated cyclic monomers that contribute to higher glass transition temperatures, chemical resistance, or adhesion to metal substrates. Suitable ethylenically-unsaturated cyclic monomers include non-styrenic monomers having cyclic groups and ethylenically-unsaturated groups (e.g., cyclic vinyl monomers), such as one or more ethylenically-unsaturated aromatic monomers, ethylenically-unsaturated alicyclic monomers, and mixtures thereof.

Illustrative ethylenically-unsaturated cyclic monomers include those having the structure shown below in Formula 1:

Formula 1

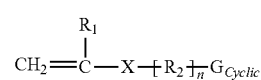

where group $R_1$ may be a hydrogen atom or an organic group, such as a $C_1$-$C_8$ or $C_1$-$C_6$ alkyl group, and more preferably a hydrogen atom or a methyl group. Additionally, one or both of the hydrogen atoms attached to the terminal carbon atom in the ethylenically-unsaturated carbon atom shown in Formula 1 may be replaced with an independent group $R_1$. Group $R_2$ may be any suitable divalent organic group, such as, for example, a $C_1$-$C_{16}$ alkenyl group, which can be substituted with one or more (e.g., 1-3) groups such as hydroxy groups, halogen groups, oxirane groups, or alkoxy groups, for example.

Group X may be a —COO— ester group of either directionality, another step-growth linkage group, a hydrocarbyl group, a combination thereof, or may be omitted. In preferred embodiments, the ethylenically-unsaturated cyclic monomers are free of oxirane groups or halogen groups, and more preferably free of both such groups. The integer "n" may be zero or one, where, when "n" is zero, group $R_2$ is omitted and the —X-$G_{Cyclic}$ group extends directly from the ethylenically-unsaturated carbon-carbon double bond shown in Formula 1. In some preferred embodiments, when group $G_{Cyclic}$ is an aromatic ring, Group X is a —COO— ester group in either directionality or "n" is one, such that the aromatic ring does not directly extend from the carbon-carbon double bond. In further preferred embodiments, the double bond includes a terminal carbon of the molecule (e.g., a $CH_2$ group), as shown in Formula 1.

As discussed above, in preferred embodiments, at least a portion of the styrene-mimicking monomers are polycyclic monomers containing ring unsaturation, and does not include polycyclic groups which only possess aromatic double bonds. The Group $G_{cyclic}$ in such monomers may be any suitable group having two or more cyclic groups, where at least a portion of the cyclic groups contain ring unsaturation that remains unreacted during polymerization of the latex copolymer such that the unreacted cyclic group(s) remain as a pendant or terminal group of the copolymer chain. For example, Group $G_{cyclic}$ may include two or more $C_3$-$C_{10}$ ring structures, where at least one of the ring structures includes unsaturation. One or more of the carbon atoms in such ring structures may be substituted with other atoms, such as oxygen, nitrogen, nitrogen, silicon, sulfur, phosphorus, and the like. Furthermore, Group $G_{cyclic}$ may also include one or more additional groups that may extend from one or more atoms of the ring structures(s), such as one or more organic groups (e.g., $C_1$-$C_{16}$ alkyl or alkenyl groups), hydroxy groups, halogen groups, oxirane groups, and alkoxy groups, for example. Group $G_{Cyclic}$ preferably includes two or more alicylic or aromatic rings, such as bicyclic groups, tricyclic groups, tetracyclic groups, and the like, where adjacent rings may have fused, bridged, or spiro arrangements. In these embodiments, each ring structure more preferably includes a $C_3$-$C_{10}$ ring structure, where adjacent rings preferably contain at least one common atom. In some further embodiments, adjacent rings of the polycyclic group contain at least two common atoms (e.g., for fused and bridged rings). In some additional embodiments, adjacent rings of the polycyclic group contain at least three common atoms (e.g., for bridged rings). In certain preferred embodiments, the polycyclic group includes two or more 5-atom rings, two or more 6-atom rings, or at least one 5-atom ring and at least one 6-atom ring.

In some embodiments, the one or more polycyclic groups are unsaturated bicyclic groups represented by the IUPAC (International Union of Pure and Applied Chemistry) nomenclature of Formula 2 below:

bicyclo[x·y·z]alkene           Formula 2 where "x" is an integer having a value of 2 or more, "y" is an integer having a value of 1 or more, "z" is an integer having a value of 0 or more, and the term alkene refers to the IUPAC nomenclature designation (e.g., hexene, heptene, heptadiene, octene, etc.) for a given bicyclic molecule and denotes that that the bicyclic group includes one or more double bonds (more typically one or more carbon-carbon double bonds).

In some embodiments, "z" in Formula 2 is one or more. In other words, in certain embodiments, the bicyclic groups are bridged bicyclic groups. By way of example, bicyclo [4.4.0]decane is not a bridged bicyclic. In some embodiments, "x" has a value of 2 or 3 (more preferably 2) and each of "y" and "z" independently have a value of 1 or 2. The bicyclic structures represented by Formula 2 include one or more carbon-carbon double bonds (e.g., 1, 2, 3, etc.).

Non-limiting examples of some suitable unsaturated bicyclic groups represented by Formula 2 include bicyclo[2.1.1] hexene, bicyclo[2.2.1]heptene (viz., norbornene), bicyclo [2.2.2]octene, bicyclo[2.2.1]heptadiene, and bicyclo[2.2.2] octadiene. It is also contemplated that the bicyclic groups represented by Formula 2 may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic group) or acyclic groups may be attached to the bicyclic group represented by Formula 1. Thus, for example, in some embodiments the bicyclic group of Formula 1 may be present in a tricyclic or higher group. In some embodiments, some of the bicyclic groups may be saturated. In one embodiment, the bicyclic group includes two saturated spiro, fused, or bridged rings and further includes one or more unsaturated rings.

Specific examples of polycyclic styrene-mimicking monomers containing one or more cyclic groups, ring unsaturation and ethylenically-unsaturated pendant groups include norbornene (meth)acrylate, tricyclodecenyl (meth) acrylate, octahydronapthalene (meth)acrylate, norbornene (meth)acrylamide, tricyclodecenyl (meth)acrylamide, octahydronapthalene (meth)acrylamide, tricyclodecenyl vinyl acetate, norbornene vinyl acetate, octahydronapthalene vinyl acetate, other vinyl variations thereof, and mixtures thereof. Norbornene (meth)acrylate and tricyclodecenyl (meth)acrylate represent preferred such monomers. Tricyclodecenyl (meth)acrylate is commercially available as dihydrocdicyclopenta-dienyl acrylate (DCPA) from BASF SE of Ludwigshafen, Germany, having a molecular formula of $C_{13}H_{16}O_2$, and the structure:

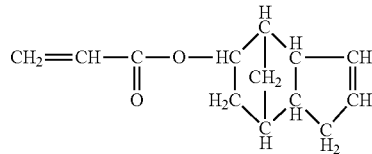

Formula 3

In some embodiments, the one or more polycyclic groups are derived from plant based materials such as, for, example corn. Examples of suitable plant-based materials include compounds derived from sugars, with anhydrosugars being preferred, and dianhydrosugars being especially preferred. Examples of suitable such compounds include bisanhydrodexitol or isohexide compounds, such as isosorbide, isomannide, isoidide, derivatives thereof, and mixtures thereof.

The styrene-mimicking monomers may include additional functional groups that impart added functionality (e.g., crosslinkability) to the latex copolymer. Such added functionality may be obtained by employing appropriate free-radically polymerizable monomers in the latex polymerization, such as (meth)acrylic monomers with secondary olefinic unsaturation and fused-ring systems. These monomers can be used to functionalize the latex and impart reactive sites that can later be crosslinked via a self-crosslinking reaction under baking conditions in the presence of the disclosed drying agents or an inter-particle crosslinking reaction in the presence of the disclosed crosslinking agents. Such crosslinking will be in addition to the enhanced crosslinking arising out of the disclosed sites of ring unsaturation, and may provide further improvements in corrosion resistance or flexibility. Such added functionality may moreover provide performance improvements when the level of conventional crosslinkers is reduced or when such crosslinkers are absent.

The polycyclic styrene-mimicking monomers may constitute greater than about 1%, greater than about 5%, greater than about 10% or greater than about 20% by weight of the latex copolymer, based on the total weight of the reactant monomers, including both cross-linkable and unreacted monomers. The polycyclic styrene-mimicking monomers may also constitute less than about 50%, less than about 45%, less than about 40%, or less than about 35% by weight of the latex copolymer, based on the total weight of the reactant monomers including both cross-linked (i.e. reacted) and unreacted monomers.

The styrene-mimicking monomers may include other ethylenically-unsaturated, cyclic-group containing monomers that do not include ring unsaturation. Such other styrene-mimicking monomers may provide useful properties (e.g., enhanced Tg) in latex copolymers made without styrene, or with reduced levels of styrene, but are not believed to impart significantly improved reactivity to the latex copolymer in a crosslinking reaction. Exemplary such monomers include (i) ethylenically-unsaturated monomers having a saturated monocyclic group with a ring structure having 3-5 atoms in the ring, (ii) ethylenically-unsaturated monomers, other than styrene, having a saturated monocyclic group with 6 or more atoms in the ring, (iii) ethylenically-unsaturated monomers having a saturated polycyclic group, and (iv) combinations thereof. Exemplary monomers (i) include cyclopropyl (meth)acrylate, cyclobutyl (meth)acrylate, cyclopentyl (meth)acrylate and tetrahydrofurfuryl (meth)acrylate. Exemplary monomers (ii) include cyclohexyl (meth)acrylate. Exemplary monomers (iii) include isobornyl (meth)acrylate), norbornane (meth)acrylate, isosorbide (meth)acrylate, tricyclodecane (meth)acrylate, bicyclo[4.4.0]decane (meth)acrylate, isobornyl (meth)acrylamide), norbornane (meth)acrylamide, isosorbide (meth)acrylamide, tricyclodecane (meth)acrylamide, bicyclo[4.4.0]decane (meth)acrylamide, other vinyl variations thereof, and mixtures thereof. Such other styrene-mimicking monomers may for example represent at least about 10%, at least about 20% or at least about 30% by weight of the latex copolymer, based on the total weight of the reactant monomers, and up to about 80, up to about 70 or up to about 60% by weight of the latex copolymer, based on the total weight of the reactant monomers.

The disclosed latex copolymers may also be formed using styrene, and in some embodiments, substantial amounts of styrene including, for example, 60% by weight or more of total reactants. As noted above, styrene-free compositions may be preferred for some applications (for example, in applications involving food-contact or beverage-contact coatings), but in other applications may not be required.

The disclosed copolymers are also formed from ethylenically-unsaturated other monomers that do not contain cyclic groups (viz., "non-cyclic monomers"). Exemplary non-cyclic monomers include (meth)acrylate monomers, (meth)acrylamide monomers, vinyl acetate monomers, vinyl ester monomers, acrylonitrile, and other polymerizable (e.g. free radically polymerizable) monomers containing ethylenic unsaturation.

Exemplary non-cyclic (meth)acrylate monomers for use in the latex copolymer include those having the structure shown below in Formula 4:

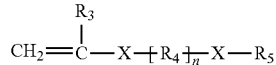

Formula 4 where group Ra may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_3$. Groups $R_4$ and $R_5$ may each independently be any suitable organic group, such as, for example, a $C_1$-$C_{16}$ alkyl or alkenyl group, which can be substituted with one or more (e.g., 1-3) groups such as hydroxy groups, halogen groups, phenyl groups, oxirane groups, and alkoxy groups, for example.

Group X in Formula 4 is a —COO— ester group, of either directionality. In preferred embodiments, the mono-unsaturated monomers are free of oxirane groups or halogen groups, and more preferably both. The integer "n" may be zero or one, more preferably zero such that group $R_4$ is omitted and the —X—$R_5$ group extends directly from the unsaturated group. In further preferred embodiments, the unsaturated bond (e.g., double bond) is connected to a terminal carbon of the molecule (e.g., a $CH_2$ group), as shown in Formula 4.

Specific examples of suitable non-cyclic (meth)acrylates encompass alkyl (meth)acrylates, which are preferably esters of acrylic or methacrylic acid. Examples of suitable alkyl (meth)acrylates include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, decyl (meth)acrylate, isodecyl (meth)acrylate, lauryl (meth)acrylate, octyl (meth)acrylate, nonyl (meth)acrylate, hydroxyethyl acrylate, hydroxyethyl methacrylate, hydroxypropyl (meth)acrylate, and mixtures thereof. Preferred such monomers contribute to a cured coating film having a relatively "high" glass transition temperature, and include ethylenically-unsaturated monomers having homopolymers with glass transition temperatures >50° C., >60° C., >70° C., >80° C., or >90° C. Specific examples include acrylic acid (106° C.), methacrylic acid (228° C.), methyl methacrylate (105° C.), ethyl methacrylate (65° C.), isobutyl methacrylate (53° C.), 2-hydroxy ethyl methacrylate (55° C.) and 2-hydroxy propyl methacrylate (55° C.), wherein a glass transition temperature for a homopolymer of each monomer as recited in H. Coyard et al., Resins for Surface Coatings: Acrylics & Epoxies 40-41 (PKT Oldring, ed.), Vol. 1 (2nd ed. 2001) is reported in parentheses. Methyl methacrylate is a preferred such monomer.

Other non-cyclic monomers that may be employed include acrylonitrile (97° C.), acrylamide (165° C.) and vinyl acetate.

The non-cyclic monomers may constitute greater than about 10%, greater than about 20% or greater than about 30% by weight of the latex copolymer, based on the total weight of the reactant monomers. The non-cyclic monomers may also constitute less than about 80%, less than about 70% or less than about 60% by weight of the latex copolymer, based on the total weight of the reactant monomers.

The non-cyclic monomers shown in Formula 4 each have a single ethylenically-unsaturated group. The reactant monomers may also include one or more monomers each having two or more ethylenically-unsaturated groups (referred to as "multi-unsaturated monomers"), which preferably react during the emulsion polymerization to crosslink the otherwise separate copolymer chains or to function as growth sites for adjacent copolymer chains. Examples of suitable multi-unsaturated monomers include multi-functional (meth)acrylate monomers, multi-functional vinyl monomers, multi-functional maleate monomers, multi-functional olefin monomers, and the like. Illustrative multi-unsaturated monomers include those represented by the following structure:

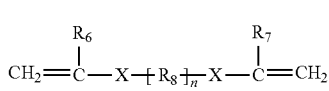

Formula 5 where groups $R_6$ and $R_7$ may independently be a hydrogen atom or an organic group, such as a $C_1$-$C_6$ alkyl group, and more preferably a hydrogen atom or a methyl group. Additionally, one or both of the hydrogen atoms attached to the terminal carbon atom of each ethylenically-unsaturated group may independently be replaced with a group $R_6$. Groups X may each independently be a —COO— ester group of either directionality, may be independently be substituted with an organic group, such as a hydrocarbon group (e.g., for producing an allyl terminal group) or another heteroatom-containing group (e.g., another type of divalent step-growth linkage group), or may be omitted.

Group $R_8$ may be any suitable divalent group, such as, for example, a $C_2$, $C_3$, $C_4$, $C_5$, or $C_6$ hydrocarbon group, where one or more hydrogen atoms of the hydrocarbon group may each optionally be substituted with a group $R_6$, a polar group (e.g., a hydroxy group, an amino group, and the like), and an alkoxy group, for example. In some embodiments, group $R_8$ is selected from a $C_2$, $C_3$, $C_4$, $C_5$, or $C_6$ hydrocarbon moiety. In some embodiments, group $R_8$ may include one or more cyclic groups, which may be saturated, unsaturated, or aromatic, and may be monocyclic or polycyclic groups.

In additional preferred embodiments, each unsaturated bond (e.g., double bond) is connected to a terminal carbon of the molecule (e.g., a $CH_2$ group), as shown in Formula 5. In further additional embodiments, one or more hydrogen atoms of the hydrocarbon group in group R& may also be substituted with a branched ethylenically-unsaturated group, such that the multi-unsaturated monomer may have a total of three or more ethylenically-unsaturated groups.

Specific examples of suitable multi-functional monomers include polyhydric alcohol esters of acrylic acid or methacrylic acid, such as ethanediol di(meth)acrylate, propanediol di(meth)acrylate, butanediol di(meth)acrylate (e.g., 1,3-butanediol dimethacrylate and 1,4-butanediol di(meth)acrylate), heptanediol di(meth)acrylate, hexanediol di(meth)acrylate, trimethylolethane tri(meth)acrylate trimethylolpropane tri(meth)acrylate, trimethylolbutane tri(meth)acrylate, trimethylolheptane tri(meth)acrylate, trimethylolhexane tri(meth)acrylate, tetramethylol methane tetra (meth)acrylate, dipropylene glycol di(meth)acrylate, trimethylol hexane tri(meth)acrylate, pentaerythritol tetra(meth) acrylate, isosorbide di(meth)acrylate, and mixtures thereof.

In additional embodiments, the multi-functional monomers may include at least two different functional groups, such as an ethylenically-unsaturated group and an oxirane group (e.g., GMA or glycidyl acrylate). In these embodiments, one of the ethylenically-unsaturated groups in Formula 5 shown above may be replaced with an alternative functional group that is configured to react with a reciprocating functional group of a copolymer chain (e.g., an oxirane group for reacting with a hydroxyl group of a copolymer chain).

However, in some preferred embodiments, the reactant components are substantially free or completely free of glycidyl methacrylate ("GMA") and glycidyl acrylate. In more preferred embodiments, the reactant components are substantially free or completely free of monomers having oxirane groups. These preferred characteristics may also apply to the resulting latex copolymer, the latex emulsion, the coating composition, and the cured coating. As such, in preferred embodiments, the latex copolymer, the latex emulsion, the coating composition, and the cured coating are each also substantially free or completely free of mobile or bound GMA and glycidyl acrylate, substantially free or completely free of monomers having oxirane groups, or substantially free or completely free of mobile or bound GMA, glycidyl acrylate and oxirane groups. In these embodiments, the monomer shown above in Formula 5 preferably includes two or more ethylenically-unsaturated groups.

The multi-unsaturated monomers, if used, may constitute greater than about 1%, greater than about 5%, greater than about 8%, and in some embodiments greater than about 10%, based on the total weight of the reactant monomers. The multi-unsaturated monomers may also constitute less than about 25%, less than about 20%, or less than about 15%, based on the total weight of the reactant monomers.

The non-cyclic monomers may also include ethylenically-unsaturated acid-functional monomers, such as ethylenically-unsaturated carboxylic acid monomers, anhydrides thereof, salts thereof, and mixtures thereof. Illustrative ethylenically-unsaturated carboxylic acid monomers include those represented by the following structure:

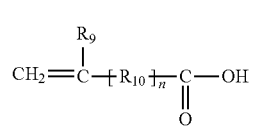

Formula 6 where the group $R_9$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_9$. Group $R_{10}$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example.

In preferred embodiments, the ethylenically-unsaturated acid-functional monomers are free of oxirane groups or halogen groups, and more preferably free of both oxirane groups and halogen groups. The integer "n" may be zero or one, more preferably zero such that group $R_{10}$ is omitted and the carboxyl (—COOH) group extends directly from the unsaturated group. In preferred embodiments, the unsaturated bond (e.g., double bond) is connected to a terminal carbon of the molecule (e.g., a $CH_2$ group), as shown in Formula 6.

Examples of suitable ethylenically-unsaturated carboxylic acid monomers include acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, and mixtures thereof. Preferred ethylenically-unsaturated carboxylic acid monomers include acrylic acid, methacrylic acid, crotonic acid, fumaric acid, maleic acid, 2-methyl maleic acid, itaconic acid, 2-methyl itaconic acid, and mixtures thereof.

Examples of suitable ethylenically-unsaturated anhydride monomers include compounds derived from the above-discussed ethylenically-unsaturated carboxylic acid monomers (e.g., as pure anhydrides or mixtures of such). Preferred ethylenically-unsaturated anhydrides include acrylic anhydride, methacrylic anhydride, and maleic anhydride. If desired, salts of the above ethylenically-unsaturated carboxylic acid monomers may also be employed.

The ethylenically-unsaturated acid-functional monomers may collectively constitute greater than about 1%, greater than about 3% or greater than about 5% by weight, based on the total weight of the reactant monomers. The ethylenically-unsaturated acid-functional monomers may also collectively constitute less than about 40%, less than about 30%, or less than about 20%, based on the total weight of the reactant monomers, both cross-linked (i.e. reacted) and unreacted.

The disclosed latex copolymers may optionally be formed using polymerizable surfactants. Such surfactants may assist in dispersing the reactant monomers in the aqueous carrier, and may polymerize with each other or copolymerize with the reactant monomers to form the copolymer chains. As such, in some embodiments, the polymerizable surfactants are preferably capable of polymerizing or otherwise reacting under free radical-initiated polymerization conditions. For instance, the polymerizable surfactants may each have one or more hydrophobic portions, one or more hydrophilic portions, and an ethylenically-unsaturated group located at the hydrophobic portion, at the hydrophilic portion, or in-between.

The hydrophobic portion(s) may be any suitable substituted or unsubstituted hydrocarbon chain, such as a substituted or unsubstituted alkyl or alkenyl group, a substituted or unsubstituted cyclic hydrocarbon group, a substituted or unsubstituted aromatic hydrocarbon group, and combinations thereof. The hydrophobic portion(s) preferably include one or more non-polar groups, such as one or more aromatic groups.

The hydrophilic portion(s) may be any suitable substituted or unsubstituted hydrocarbon chain, such as a substituted or unsubstituted alkyl or alkenyl chain, optionally with one or more ether linkages, which terminates in a polar group. The polar group may include one or more hydroxyl groups, acid groups (e.g., carboxylic acid groups), sulfonate groups, sulfinate groups, sulfate groups, phosphate groups, phosphinate groups, phosphonate groups, salt derivatives thereof, and combinations thereof.

Examples of suitable polymerizable surfactants include those disclosed in U.S. Publication No. US 2002/0155235 A1; and those commercially available under the trademark "REASOAP" from Adeka Corporation, Tokyo, Japan., under the trademarks "NOIGEN" and "HITENOL" from Da-Ichi Kogyo Siyyaku Co., Ltd., Tokyo, Japan; and under the trademark "SIPOMER" from Solvay Rhodia, Brussels, Belgium.

In embodiments that include polymerizable surfactants, the polymerizable surfactants may constitute greater than about 1%, greater than about 2%, or greater than about 3% by weight, based on the total weight of the reactant monomers. The polymerizable surfactant may also constitute less than about 25%, less than about 15%, or less than about 10% by weight, based on the total weight of the reactant monomers.

In preferred embodiments, the reactant monomers include a combination of one or more styrene-mimicking monomers, one or more non-cyclic (meth)acrylate monomers, and one or more ethylenically-unsaturated acid-functional monomers. In certain preferred embodiments, the reactant monomers further include one or both of: (i) one or more multi-unsaturated monomers, and (ii) one or more polymerizable surfactants. In such embodiments the non-cyclic monomers may for example constitute from about 20% to about 50% by weight, and more preferably from about 30% to about 40% by weight; the (meth)acrylic acids may constitute from about 1% to about 25% by weight, and more preferably from about 5% to about 15% by weight; and the polymerizable surfactants may constitute from 0% to about 15% by weight, and more preferably from about 5% to about 10% by weight; based on the entire weight of the reactant monomers used to produce the latex copolymer.

In some aspects, some of the non-cyclic monomers may terminate in polar groups, such as hydroxyl groups. In these embodiments, the non-cyclic monomers with the terminal polar groups (preferably hydroxyl groups) may constitute from about 1% to about 20% by weight, and more preferably from about 5% to about 15% by weight; based on the entire weight of the reactant monomers, both cross-linked (i.e. reacted) and unreacted. The non-cyclic monomers without the terminal polar groups may accordingly constitute the remainder of the non-cyclic monomers.

A first preferred combination of reactant monomers includes two or more ethylenically-unsaturated polycyclic monomers at least one of which includes ring unsaturation (and does not include aromatics), one or more non-aromatic (meth)acrylate monomers, one or more (meth)acrylic acids, and optionally one or both of: (i) one or more multi-functional (meth)acrylate monomers and (ii) one or more polymerizable surfactants. In this embodiment, the ethylenically-unsaturated polycyclic monomers preferably constitute at least about 10% by weight, at least about 20% by weight, or at least about 30% by weight of the monomers used to produce the latex copolymer. The reactant monomers may also optionally include one or more non-styrenic, ethylenically-unsaturated monocyclic monomers. Exemplary non-styrenic, ethylenically-unsaturated monocyclic monomers include furfuryl (meth)acrylate, benzyl (meth)acrylate, benzyl 2-ethyl acrylate, 2-(4-benzoyl-3-hydroxyphenoxy)ethyl acrylate, vinyl toluene and benzyl 2-propylacrylate.

A second preferred combination of reactant monomers includes one or more ethylenically-unsaturated monocyclic monomers each having a ring structure with 3-5 atoms in the ring, one or more non-cyclic (meth)acrylate monomers, one or more (meth)acrylic acids, and optionally one or both of: (i) one or more multi-functional (meth)acrylate monomers and (ii) one or more polymerizable surfactants. In this embodiment, the ethylenically-unsaturated, monocyclic monomer(s) with 3-5 atom rings preferably constitute at least about 5% by weight or at least about 10% by weight of the monomers used to produce the latex copolymer, and the reactant monomers may also optionally include one or more non-styrenic, ethylenically-unsaturated monocyclic monomers having six or more atoms in the ring. In some embodiments, the ethylenically-unsaturated monocyclic monomers each having a ring structure with 3-5 atoms in the ring preferably constitute at least about 20% by weight, or at least about 30% by weight, based on a total weight of the monomers used to produce the latex copolymer.

A third preferred combination of reactant monomers includes one or more ethylenically-unsaturated polycyclic monomers, one or more ethylenically-unsaturated monocyclic monomers each having a ring structure with 3-5 atoms in the ring, one or more non-cyclic (meth)acrylate monomers, one or more (meth)acrylic acids, and optionally one or both of: (i) one or more multi-functional (meth)acrylate monomers and (ii) one or more polymerizable surfactants. In this embodiment, the combined concentrations of the ethylenically-unsaturated polycyclic monomer(s) and the ethylenically-unsaturated monocyclic monomer(s) each having a ring structure with 3-5 atoms in the ring preferably constitute at least about 10% by weight of the monomers used to produce the latex copolymer. In this case, the reactant monomers may also optionally include one or more non-styrenic, ethylenically-unsaturated monocyclic monomers having six or more atoms in the ring. In some embodiments, the combined concentrations of the ethylenically-unsaturated polycyclic monomer(s) and the ethylenically-unsaturated monocyclic monomer(s) each having a ring structure with 3-5 atoms in the ring preferably constitute at least about 10% by weight, at least about 20% by weight, or at least about 30% by weight, based on a total weight of the monomers used to produce the latex copolymer.

The liquid carrier can include an aqueous carrier, or one or more organic solvents. The aqueous carrier may include water, and optionally, one or more organic solvents. Examples of suitable organic solvents for use as the liquid carrier or in the aqueous carrier may include methanol, ethanol, isopropyl alcohol, butyl alcohols (e.g., n-butanol and butyl glycol), 2-butoxyethanol, 2-(2-butoxyethoxy) ethanol (viz., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Optionally, one or more non-polymerizable surfactants (e.g., non-polymeric surfactants) may also be used (viz., alone or in combination with one or more polymerizable surfactants, or one or more polymeric surfactant such as, e.g., acrylic polymers having water-dispersing groups such as neutralized acid or base groups), such as surfactants that can support emulsion polymerization reactions. For example, the non-polymerizable surfactant(s) may include surfactants containing sulfonate groups, sulfate groups, phosphate groups, phosphinate groups, phosphonate groups, and combinations thereof; as well as ethoxylated surfactants. An example of a non-polymerizable surfactant includes dodecylbenzene sulfonic acid and sulfonates thereof (e.g., dodecylbenzene sulfonate salts, and particularly amine- or ammonia-neutralized salts).

The concentration of non-polymerizable surfactants may vary depending on the types and concentrations of the reactant components, including the presence of any polymerizable surfactants. In embodiments that include non-polymerizable surfactants, the non-polymerizable surfactants may constitute greater than about 0.01%, greater than about 0.05%, or greater than about 0.1% by weight, relative to the total weight of the reactant components. The non-polymerizable surfactants may also constitute less than about 10%, less than about 7%, or less than about 5% by weight, relative to the total weight of the reactant components.

Although it is contemplated that surfactants that are non-polymerizable and non-polymeric can be used in some embodiments, it is generally preferable to use a polymeric surfactant or a polymerizable surfactant to, for example, minimize or eliminate the possibility of surfactant migrating out of the cured coating and into the packaged product.

In some preferred embodiments, a polymeric surfactant having a sufficient amount of water-dispersing groups (e.g., salt, or salt-forming groups, such as neutralized acid or neutralized base groups) to facilitate the emulsion polymerization of the reactant monomers may be used to support the emulsion polymerization, either alone or in combination with any of the other types of surfactants referenced herein. Examples of polymer-based surfactants include those disclosed in U.S. Pat. No. 8,092,876 and PCT International Publication Number WO2014/140057, each of which is incorporated by reference to the extent that it doesn't conflict with the present disclosure. In these embodiments, the polymer surfactants can constitute up to about 40% by solids weight in the aqueous dispersion. Such polymeric surfactants may be acrylic polymers, epoxy polymers, polyester polymers, polyolefins (e.g., (poly)ethylene (meth) acrylic acid copolymers such as, e.g., the PRIMACOR 5980i or PRIMACOR 5990i products), polyurethane polymers, or copolymers or mixtures thereof, with acrylic polymeric surfactants being particularly preferred.

In embodiments in which the coating composition comprises an emulsion-polymerized latex copolymer, the emulsion polymerization process may be conducted in a variety of manners. In some preferred embodiments, the emulsion polymerization process uses a pre-emulsion monomer mixture in which some or all of the reactant components and any optional surfactants are dispersed in the aqueous carrier under agitation to form a stable pre-emulsion.

A portion of the surfactants (e.g., polymerizable or non-polymerizable) and a portion of the aqueous carrier may also be introduced into a reactor, and are preferably heated, agitated, and held under nitrogen sparge to assist in the subsequent polymerization reactions. Preferred temperatures for heating the surfactant dispersion include temperatures greater than about 65° C., and more preferably from about 70° C. to about 90° C.

The pre-emulsion may then be fed to the heated aqueous dispersion in the reactor incrementally or continuously over time. Alternatively, in certain embodiments a batch or semi-batch process may be used to polymerize the reactant monomers in the aqueous dispersion, as described in, for example, U.S. Pat. No. 8,092,876. In further embodiments, the polymerization process can occur in a classic two-stage (or multiple stage) core-shell arrangement. Alternatively, the polymerization process can occur in a multiple stage "inverse core shell" arrangement as discussed in International Publication No. WO2015/002961. Intermediate hybrids of these processes may also be used.

One or more polymerization initiators may also be added to the aqueous dispersion (e.g., along with the reactant components) at any suitable time(s) to initiate the emulsion polymerization. Suitable polymerization initiators include free-radical initiators, such as one or more peroxides or persulfates and similar compounds. Examples of suitable peroxides include hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates; and mixtures thereof.

Azoic compounds can also be used to generate free radicals such as 2,2'-azo-bis(isobutyronitrile), 2,2'-azo-bis (2,4-dimethylvaleronitrile), and 1-t-butyl-azocyanocyclohexane, and mixtures thereof. Examples of suitable persulfates include persulfates of ammonium or alkali metal (potassium, sodium or lithium). Perphosphates can be also a source of free radicals, and mixtures thereof.

Polymerization initiators can be used alone or as the oxidizing component of a redox system, which also typically includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, ferrous complexes (e.g., ferrous sulphate heptahydrate), and mixtures thereof. The reducing component is frequently referred to as an accelerator or a catalyst activator.

The initiator and accelerator (if used) are preferably each used in concentrations greater than about 0.001%, more preferably greater than about 0.01%, and more preferably greater than about 0.1% by weight, relative to the total weight of the reactant components. The initiator and accelerator (if used) are also each preferably used in concentrations less than about 5%, more preferably less than about 3%, and in some embodiments, less than about 1% by weight, relative to the total weight of the reactant components.

Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe (II), and ammonium persulfate/sodium bisulfite/sodium hydrosulfite/Fe(II).

The emulsion polymerization may continue for a suitable duration to polymerize the reactant components with a free-radical initiated polymerization process. This can produce each latex copolymer as a particle dispersed or otherwise suspended in the aqueous solution. And, in some embodiments, the latex copolymer may include linear or branched copolymer chains that are cross-linked with linkages derived from the multi-unsaturated monomers. It should be noted that such copolymers will however not be completely crosslinked, in that they will contain unreacted crosslinkable sites from the polycyclic styrene-mimicking monomers having ring unsaturation, which sites may be later crosslinked upon application and curing of the disclosed coating.

After the polymerization is completed, in some embodiments, at least a portion of the carboxylic acid groups or anhydride groups of the latex copolymer (or other salt-forming groups such as, e.g., neutralizable base groups) may be neutralized or partially neutralized with a suitable basic compound (or other suitable neutralizing compound) to produce water-dispersing groups. The basic compound used for neutralization is preferably a fugitive base, more preferably a fugitive nitrogen base (e.g., ammonia and primary, secondary, or tertiary amines), with amines being particularly preferred. Other suitable bases may include the metallic bases described in the application filed on the same date herewith and entitled "Latex Polymers Made Using Metallic-Base-Neutralized Surfactant and Blush-Resistant Coating Compositions Containing Such Polymers" described in International Application No. WO 2017/112837 A1.

Some examples of suitable amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred amines.

The degree of neutralization required may vary considerably depending upon the amount of acid or base groups included in the latex copolymer, and the degree of dispersibility that is desired. In embodiments in which neutralized acid groups are used for water dispersibility, preferred acid numbers for the copolymer prior to neutralization include acid numbers greater than about 40, more preferably greater than about 80, and even more preferably greater than about 100 milligrams (mg) potassium hydroxide (KOH) per gram of the latex copolymer.

Preferred acid numbers for the latex copolymer prior to neutralization also include acid numbers less than about 400, more preferably less than about 350, and even more preferably less than about 300 mg KOH per gram of the latex copolymer. Acid numbers referred to herein may be calculated pursuant to BS EN ISO 3682-1998 standard, or alternatively may be theoretically determined based on the reactant monomers.

Typically, to render the latex copolymer water-dispersible, at least 25% of the acid groups of the latex copolymer are neutralized, preferably at least 30% are neutralized, and more preferably at least 35% are neutralized. Preferably, the latex copolymer includes a sufficient number of water-dispersing groups to form a stable dispersion in the aqueous carrier. Furthermore, in embodiments incorporating polymerizable surfactants or other surfactants, the hydrophilic portions of the surfactant may also assist in dispersing the latex copolymer in the aqueous carrier.

While the latex copolymer has been primarily described herein with acid-based water-dispersing groups that are neutralized with basic compounds, in alternative embodiments, the water-dispersing groups may be basic groups that are neutralized with acidic compounds. Examples of suitable basic groups for this embodiment include those disclosed in O'Brien et al., U.S. Pat. No. 8,092,876. Examples of suitable acidic neutralizing compounds include formic acid, acetic acid, hydrochloric acid, sulfuric acid, and mixtures thereof.

After polymerization or neutralization, the resulting particles of the latex copolymer are provided in the aqueous carrier as a dispersion of the latex copolymer. In some preferred embodiments, the copolymer chains of the latex copolymer may include one or more ester groups, one or more hydroxyl groups, one or more water-dispersing groups (e.g., carboxylic acid groups, anhydride groups, or neutralized salts thereof), or one or more cyclic groups (e.g., aromatic groups). Additionally, the copolymer chains may be cross-linked by one or more linkages from the multi-unsaturated monomers to produce the latex copolymer.

The disclosed coating compositions include with one or both of a metal drier or crosslinking agent, in an amount sufficient to enable crosslinking of the latex copolymer with itself in the presence of the metal drier, or crosslinking of the latex copolymer with the crosslinking agent. Non-limiting examples of suitable metal driers include aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof. The amount used will depend, at least partially, upon the particular drier(s) chosen for a particular end use. In general, however, the amount of metal drier present in the coating composition, if any, may suitably be greater than about 10 parts per million ("ppm") by weight, preferably greater than about 25 ppm by weight, and more preferably greater than about 100 ppm by weight, based on the total weight of metal in the metal drier relative to the total weight of the coating composition. The amount of metal drier may suitably be less than about 10,000 ppm by weight, preferably less than about 1,000 ppm by weight, and more preferably less than about 600 ppm by weight, based on the total weight of metal in the metal drier relative to the total weight of the coating composition.

The choice of a particular crosslinking agent (sometimes referred to as a "crosslinking resin" or "crosslinker"), if used, typically will depend on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred crosslinking agents are substantially free of BPA, BPF, BPS, glycidyl ether compounds thereof (e.g., BADGE), and epoxy novolacs. Any of a variety of hydroxyl-reactive crosslinking agents may be used, including phenoplast, aminoplast and blocked or non-blocked isocyanate crosslinking agents, as well as combinations thereof. Exemplary phenoplast resins include the condensation products of aldehydes with phenols, with formaldehyde and acetaldehyde being preferred aldehydes. Exemplary phenols include phenol, cresol, p-phenylphenol, p-tert-butylphenol, p-tert-amylphenol, and cyclopentylphenol. Exemplary aminoplast resins include the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303. Exemplary blocked or non-blocked isocyanates include aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The concentration of crosslinking agent in the coating composition may depend on the type of crosslinking agent, the time and temperature of the bake, and the molecular weights of the copolymer particles. When used, the crosslinker is typically present in an amount of up to about 50% by weight, preferably up to about 30% by weight, and more preferably up to about 15% by weight. When used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition is be substantially free of formaldehyde and formaldehyde-conditioning materials, more preferably essentially free of these compounds, even more preferably essentially completely free of these compounds, and most preferably completely free of these compounds.

The coating composition may optionally include one or more additives. When used, the additives preferably enhance and preferably do not adversely affect the latex emulsion, or a cured coating formed from the coating composition. For example, additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an non-volatile amount of no greater than about 3% by weight, and more preferably no greater than about 1% by weight, based on the total solids weight of the coating composition.

Another useful optional additive is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional additive is an organosilicon material, such as siloxane-based or polysilicone-based materials. Representative examples of suitable such materials are disclosed in International Application Nos. WO 2014/089410 A1 and WO 2014/186285 A1.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

In preferred embodiments, the coating composition is substantially free or completely free of any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. In some embodiments, the coating composition is substantially free or completely free of any structural units derived from a bisphenol.

Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. Application Publication No. US 2013/0316109 A1, incorporated herein by reference in its entirety, for a discussion of such structural units and applicable test methods.

In some further embodiments, the coating composition is substantially free or completely free of any acrylamide-type monomers (e.g., acrylamides or methacrylamide). Moreover, in some embodiments, the coating composition is substantially free or completely free of one or more of styrene (whether free or polymerized) or substituted styrene compounds (whether free or polymerized). As discussed above, in these embodiments, the reactant monomers may include other ethylenically-unsaturated aromatic compounds or ethylenically-unsaturated alicyclic compounds, such as aromatic (meth)acrylates or alicyclic (meth)acrylates, for example. In additional further embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, the coating composition preferably has a total solids weight greater than about 5%, more preferably greater than about 10%, and even more preferably greater than about 15%, based on the total weight of the coating composition. The coating composition also preferably has a total solids weight less than about 80%, more preferably less than about 60%, and even more preferably less than about 50%, based on the total weight of the coating composition. The aqueous carrier may constitute the remainder of the weight of the coating composition.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

The coating composition preferably includes at least a film-forming amount of the latex copolymer. In some embodiments, the latex copolymer preferably constitutes greater than about 50%, more preferably greater than about 65%, and even more preferably greater than about 80% by weight of the coating composition, based on the entire weight of the total resin solids in the coating composition. The particles of the latex copolymer may constitute 100% or less, more typically less than about 99%, and even more typically less than about 95% by weight of the coating composition, based on the entire weight of the total resin solids in the coating composition.

If desired, the coating composition may also include one or more other optional polymers in addition to the latex copolymers, such as, for example, one or more acrylic polymers, alkyd polymers, epoxy polymers, polyolefin polymers, polyurethane polymers, polysilicone polymers, polyester polymers, and copolymers and mixtures thereof.

As previously discussed, the aqueous carrier of the coating composition preferably includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 80%, more preferably less than about 50%, and even more preferably less than about 40% by weight of the aqueous carrier, based on the total weight of the aqueous carrier.

The coating composition preferably has a viscosity suitable for a given coating application. In some embodiments, such as for certain spray coating applications (e.g., those discussed below for FIG. 2 and FIG. 3), the coating composition may have an average viscosity greater than about 5 seconds, more preferably greater than 10 seconds, and even more preferably greater than about 15 seconds, based on the Viscosity Test described below (Ford Viscosity Cup #4 at 25° C.). In some embodiments, the coating composition may also have an average viscosity less than about 40 seconds, more preferably less than 30 seconds, and even more preferably less than about 25, based on the Viscosity Test described below.

The coating composition of the present disclosure with the aqueous dispersion of the latex copolymer particles may be applied on a variety of different substrates using a variety of different coating techniques. In preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

For instance, FIG. 1 shows container 20, which is a simplified example of a food or beverage container that may be coated with the coating composition of the present disclosure. Container 20 may be a two-piece can having body 22 and lid piece 24, where body 22 includes sidewall 26 and bottom end 28. Lid piece 24 may be sealed to body 22 in any suitable manner, and may optionally include one or more tabs (not shown) to facilitate peeling off or opening of lid piece 24 or a portion thereof (e.g., as is common for beverage can ends and easy-open food can ends).

Sidewall 26 and bottom end 28 respectively include interior surfaces 30 and 32, and suitable substrate materials for sidewall 26 and bottom end 28 include metallic materials, such as aluminum, iron, tin, steel, copper, and the like. One or more portions of interior surfaces 30 and 32 (or exterior surface) may be coated with coating 34, which is a cured coating formed from the coating composition of the present disclosure. In some embodiments, the interior surface of lid piece 24 may also be coated with coating 34.

Figure 2:
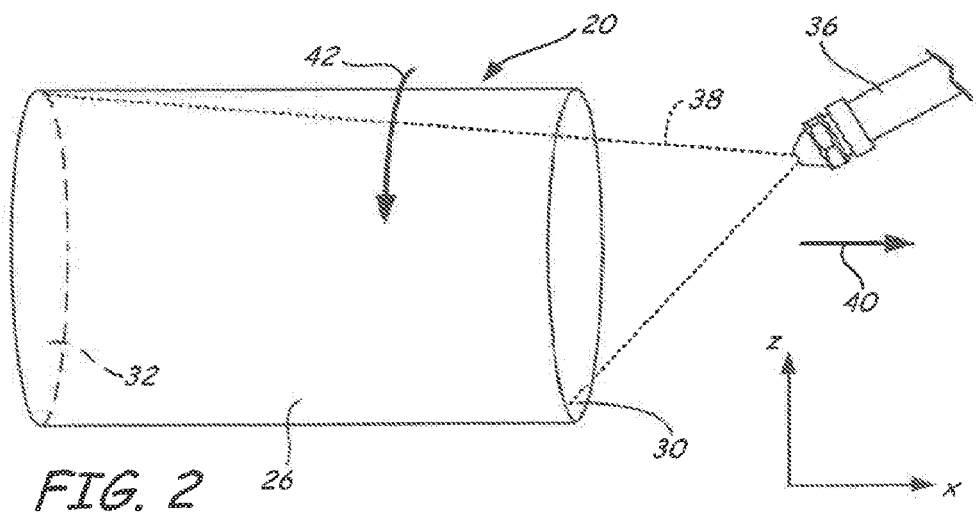
FIG. 2 is a side view of an example spray coating process for spraying the coating composition of the present disclosure onto an interior surface of a can, such as a food or beverage can.
Figure 3:
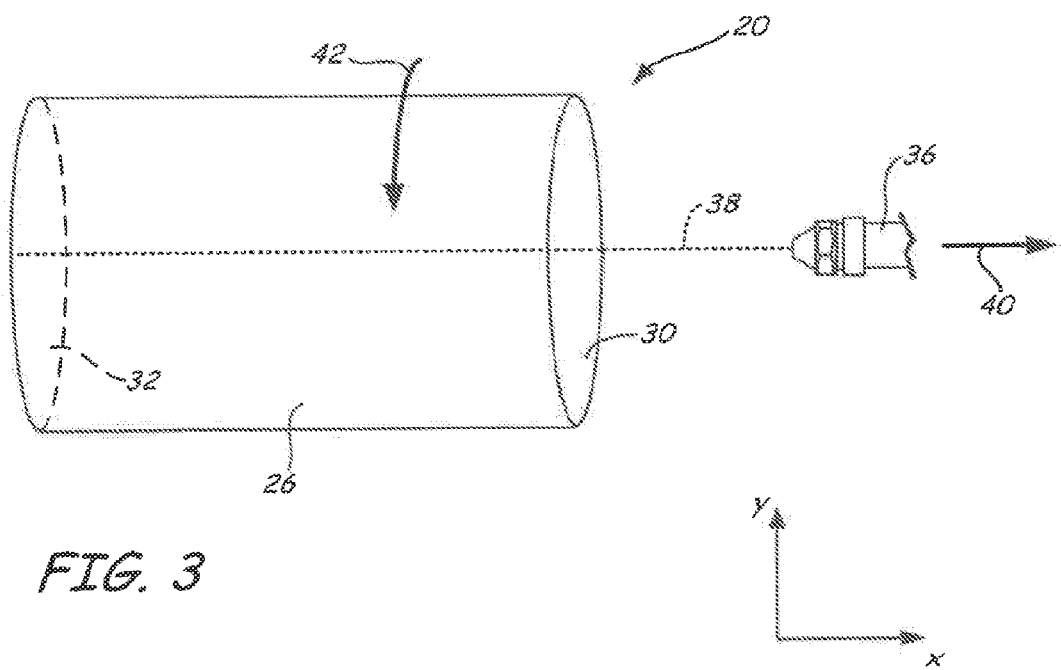
FIG. 3 is a top view of the example spray coating process shown in FIG. 2.

A suitable spray coating technique for applying the coating composition to an interior surface of a food or beverage can (e.g., surfaces 30 and 32) may involve spraying the coating composition using one or more spray nozzles capable of uniformly coating the inside of the can. For example, FIG. 2 illustrates a side view, and FIG. 3 illustrates a top view of an example setup for spray coating the coating composition onto the interior surfaces 30 and 32 of a can 20 with a spray nozzle 36 (prior to necking of an upper portion of sidewall 26). As shown, the spray nozzle 36 is preferably a controlled-pattern nozzle capable of generating a desired spray pattern, such as spray 38 having a flat-fan pattern as generally illustrated in FIG. 2 and FIG. 3.

Furthermore, spray nozzle 36 is preferably stationary, and also preferably generates spray 38 without air pressure (e.g., an airless spray operation). In some embodiments (e.g., in which the can to be sprayed is large), spray nozzle 36 may utilize a "lance spray" technique, where spray nozzle 36 may move relative to the can to reach the far inside end of the can.

In addition, the can 20 itself may be engaged to a rotating mechanism (e.g., a drive roller or belt, or a rotatable chuck mount), which is configured to rotate the can 20 at a high speed (e.g., about 2,200 rpm) around its longitudinal axis 40, as illustrated by arrows 42. This rotation of the can 20 preferably spreads the sprayed coating composition evenly across the entire interior surfaces 30 and 32. As can be seen in FIG. 2, the flat-fan pattern of spray 38 is not evenly aligned with the longitudinal axis 40 of the can 20. As such, the pattern of spray 38, as dictated by spray nozzle 36, may be non-homogenous, where the lower portion of spray 38 has a greater density of the coating composition compared to the upper portion of spray 38.

After the spray coating application, each can 20 may be moved to a curing oven to cure the sprayed coating composition, which is preferably performed within about 40 to 200 seconds from the spraying step. The curing process is preferably performed in bulk with multiple cans 20 arranged together on a continuously moving conveyor belt or track. The curing oven preferably heats the cans 20 to a suitable temperature to cure the coating composition, but that is also preferably not too high so as to degrade the coating composition, any other existing coatings on cans 20, or the metal materials of cans 20.

Preferred inside spray coating compositions of the present disclosure are capable of being spray applied on an interior of a food or beverage can (e.g., a 2-piece food or beverage can) to effectively, and evenly, coat the substrate and form a continuous cured coating (e.g., a coating that exhibits a suitable initial metal exposure value, thereby indicating that the substrate has been effectively coated and is free of unsuitable holes or other discontinuities in the coating).

Suitable curing temperatures for the coating composition of the present disclosure are greater than about 150° C. (about 300° F.), more preferably greater than about 165° C. (about 330° F.), and even more preferably greater than about 180° C. (about 360° F.). In some embodiments, suitable curing temperatures for the coating composition of the present disclosure are also less than about 220° C. (about 430° F.), more preferably less than about 205° C. (about 400° F.), and even more preferably less than about 195° C. (about 380° F.). These temperatures are based on peak metal temperature measurements of the metal walls of the cans 20 as they pass through the curing oven. For example, multiple cans 20 may be grouped together with a test can that is wired with thermocouples to measure the temperatures of one or more portions of the metal walls to ensure the cans 20 are heated enough.

Suitable residence times in the curing oven for the above-discussed temperatures range from about 40 seconds to about three minutes, more preferably about one minute to about two minutes. After curing, the resulting cured coatings (e.g., coating 34) may have suitable film thicknesses for protecting the cans 20 from food or beverage products that are subsequently filled into the cans 20.

The desired film thickness for the cured coating may vary depending on the particular food or beverage to be filled in a given can 20. In some embodiments for the spray coating application (e.g., inside spray for food or beverage cans), the average film thickness after curing is greater than about 0.7 milligrams/square-inch (mg/inch$^2$), more preferably greater than about 0.8 mg/inch$^2$, and even more preferably greater than about 0.9 mg/inch$^2$. In these embodiments, the average film thickness after curing is also less than about 4.0 mg/inch$^2$, more preferably less than about 3.0 mg/inch$^2$, and even more preferably less than about 2.5 mg/inch$^2$.

In some further embodiments, the average film thickness after curing ranges from about 0.9 mg/inch$^2$ to about 1.1 mg/inch$^2$. In other further embodiments, the average film thickness after curing ranges from about 1.4 mg/inch$^2$ to about 1.6 mg/inch$^2$. In yet other further embodiments, the average film thickness after curing ranges from about 1.9 mg/inch$^2$ to about 2.1 mg/inch$^2$.

Alternatively, the coating composition may optionally be applied as a coil coating. During a coil coating application, a continuous coil composed of a metal (e.g., steel or aluminum) is coated with the coating composition of the present disclosure. Once coated, the coating coil may be subjected to a short thermal, ultraviolet, or electromagnetic curing cycle, for hardening (e.g., drying and curing) of the coating composition. Coil coatings provide coated metal (e.g., steel or aluminum) substrates that can be fabricated into formed articles, such as two-piece drawn food cans, food can ends, drawn and ironed cans, beverage can ends, and the like.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electro-coating, extrusion coating, laminating, powder coating, and the like. The coating composition may also be useful in medical or cosmetic packaging applications, including, for example, on surfaces of metered-dose inhalers ("MDIs"), including on drug-contact surfaces.

During the above-discussed curing steps, the aqueous carrier is preferably vaporized or otherwise dried off from the latex copolymer, allowing the copolymer molecules to cure. If desired, the drying and curing steps may be combined in a single step or carried out in separate steps.

Preferred glass transition temperatures for the cured coating of the present disclosure (and particularly interior, food-contact coatings) include those greater than about 50° C., more preferably greater than about 60° C., even more preferably greater than about 70° C., and in some embodiments, greater than about 80° C. Preferred glass transition temperatures for the cured coating include those less than about 120° C., more preferably less than about 115° C., even more preferably less than about 110° C., and in some embodiments, less than about 100° C. The glass transition temperatures can be measured by dynamic mechanical analysis (DMA) or differential scanning calorimetry (DSC). Some multi-unsaturated monomers typically gel when forming homopolymers, which can limit the effectiveness of theoretical calculations using the Flory-Fox Equation.

To further prevent or otherwise reduce coating penetration by an intended food or beverage product, the cured coating is preferably suitably hydrophobic. For example, the cured coating can have a contact angle with deionized water greater than about 90, more preferably greater than about 95, and even more preferably greater than about 100.

The cured coating preferably exhibits desired properties for use as an inside spray coating for food and beverage containers. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below.

Flexibility is also important so that the coating can deflect with the metal substrate during post-cure fabrication steps (necking and dome reformation) and if the can is dropped from a reasonable height during transport or use. In some preferred embodiments, the cured coating should preferably exhibit a metal exposure less than about 3.5 mA, more preferably less than about 2.5 mA, and even more preferably less than about 1.5 mA, pursuant to the Metal Exposure After Drop Damage test below.

Moreover, the coating composition (uncured) should preferably exhibit substantially no change (e.g., a change in viscosity, if any, of less than 25%, more preferably less than 10%, even more preferably less than 5%, and even more preferably less than 1%) in viscosity pursuant to the Pot Life Stability test below. Accordingly, the coating composition of the present disclosure is particularly suitable for use as an inside spray coating composition for containers configured to retain a variety of different food or beverage products.

Property Analysis and Characterization Procedures

Various properties and characteristics of the latex emulsions, coating compositions, and coatings described herein may be evaluated by various testing procedures as described below:

1. Viscosity Test

This test measures the viscosity of a latex emulsion or coating composition for rheological purposes, such as for sprayability and other coating application properties. The test is performed pursuant to ASTM D1200-88 using a Ford Viscosity Cup #4 at 25° C. The results are measured in the units of seconds.

2. Curing Conditions

For beverage inside spray bakes, the curing conditions involve maintaining the temperature measured at the can dome at 188° C. to 210° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited can be evaluated by tests as follows.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.0 milligrams per square inch ("msi") for a beer can, 1.5 msi for a soda can, and 2.2 msi for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings should give metal exposure values of less than 3 mA, more preferred values of less than 2 mA, and even more preferred values of less than 1 mA. Commercially acceptable metal exposure values are typically less than 2.0 mA on average.

4. Metal Exposure After Drop Damage

Drop damage resistance measures the ability of the coated container to resist cracks after being in conditions simulating dropping of a filled can. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a cylindrical tube having a 2 and ⅞ inch internal diameter, can bottom down, onto an impact wedge (e.g., an inclined plane angled upwards at 45 degrees). The impact wedge is positioned relative to the tube such that a dent is formed in the rim area where the can bottom end meets the sidewall (typically referred to as the "chime" of a beverage can). The water-filled can is dropped through the tube from a 24-centimeter height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings should give metal exposure values after drop damage of less than 3.5 mA, more preferred values of less than 2.5 mA, and even more preferred values of less than 1.5 mA.

5. Adhesion

Adhesion testing is performed to assess whether the coating adheres to the coated substrate. The adhesion test was performed according to ASTM D 3359-Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

6. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

7. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, or Bush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid ($C_2H_3O_2$) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

8. Pot Life Stability

The pot life stability of a coating composition is measured by initially measuring its viscosity, and then storing the coating composition at 40° C. for one month. After the one-month period, the viscosity of the aged coating composition is measured and compared to the initial viscosity measurement. Substantially no change in viscosity (e.g., a change in viscosity, if any, of less than about 25%, more preferably less than about 15%, even more preferably less than about 10%, and even more preferably less than about 5%) indicates that the coating composition has a good pot life stability. In comparison, a significant increase in viscosity (e.g., gelation) indicates that the coating composition has poor pot life stability.

9. Glass Transition Temperature

Samples for differential scanning calorimetry ("DSC") testing may be prepared by first applying the liquid resin composition onto aluminum sheet panels. The panels are then baked in a Fisher ISOTEMP™ electric oven for 20 minutes at 300° F. (149° C.) to remove volatile materials After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

10. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure that can be used in the current invention is described in 21 CFR § 175.300 paragraph (e) (4) (xv) with the following modifications to ensure worst-case scenario performance: (1) the alcohol (ethanol) content is increased to 10% by weight, and (2) the filled containers are held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values are calculated based on surface area of the can (no end) of 44 square inches with a volume of 355 milliliters. Preferred coatings should give global extraction results of less than 50 ppm, more preferred results of less than 10 ppm, even more preferred results of less than 1 ppm. Most preferably, the global extraction results are optimally non-detectable.

11. Experimental

Solution Acrylic 1: To a 5-liter round bottom flask equipped with a thermocouple, a reflux condenser, nitrogen blanket and a prop mixer, 489.78 parts n-butanol, 40.89 parts DI water, 71.85 parts methacrylic acid, 36.14 parts styrene, 12.04 parts ethyl acrylate, 1.06 parts n-butanol, and 7.75 parts 70% benzoyl peroxide in water was added. The agitation was engaged, set to total reflux, and nitrogen blanket was activated. The set point for the heat was set to 88° C. At a reactor temperature of 93° C. hold for 15 minutes. At the end of the 15 minute hold, premix solution was charged into the vessel over 120 minutes where premix is: 637.04 parts methacrylic acid, 318.50 parts styrene, 106.16 parts ethyl acrylate, 717.98 parts n-butanol, 68.27 parts 70% benzoyl peroxide in water, and 56.73 parts DI water. At the end of the feed time the lines were flushed with 102.78 parts n-butanol and held at temperature for 150 minutes. At end of the second hold, 332.61 parts 2-butoxyethanol where charged in the reactor and vessel was cooled to room temperature.

Solution Acrylic 2: To a 5-liter round bottom flask equipped with a thermocouple, a reflux condenser, nitrogen blanket and a prop mixer, 1778.65 parts n-butanol and 87.25 parts DI water was added. The set point for the heat was set to 97° C. At a reactor temperature of 97° C. 46.44 parts of tert-butyl peroxy-2-ethylhexanoate added followed by a 5 minute hold. At the end of the hold a premix of 2245.54 parts methacrylic acid, 1496.93 parts styrene, 1247.41 parts ethyl acrylate, 2345.70 parts n-butanol, and 299.40 parts tert-butyl peroxy-2-ethylhexanoate, and 167.58 parts deionized water was added over 150 minutes. At the end of the feed time the lines were flushed with 118.63 parts n-butanol. A second feed was started of 59.33 parts of tert-butyl peroxy-2-ethylhexanoate and 24.00 parts n-butanol was added over an hour. At the end of the second feed, the lines were flushed 22.00 parts n-butanol and hold for 30 minutes. At end of the third hold, 12.89 parts of tert-butyl peroxy-2-ethylhexanoate and 1.00 parts n-butanol were charged in the reactor and held for 2 hours at temperature. At end of the final hold, 47.32 parts of deionized water was added and vessel was cooled to room temperature.

Acrylic Dispersion 1: To a 5-liter round bottom flask equipped with a thermocouple, a reflux condenser, nitrogen blanket and a prop mixer, 138.6 parts n-butanol and 104.6 parts 2-butoxyethanol was added. The agitation was engaged, set to total reflux, and nitrogen blanket was activated. The set point for the heat was set to 96° C. At a reactor temperature of 94° C., 7.81 parts of tert-butyl peroxy-2-ethylhexanoate and 1.53 parts 2-butoxyethanol was added and hold for 5 minutes. At the end of the 5 minute hold a dual-simultaneous feed was charged into the vessel over 105 minutes where premix feed 1 is: 266.3 parts styrene, 177.5 parts DCPA, 124.3 parts 2-hydroxypropyl methacrylate, 23.7 parts glycidyl methacrylate, and 35.1 parts 2-butoxyethanol. Premix feed 2 was composed of 24.8 parts of tert-butyl peroxy-2-ethylhexanoate and 20.2 parts 2-butoxyethanol. At the end of the feed time, premix feed 1 was flushed 31.9 parts 2-butoxyethanol while and addition premix of 24.8 parts of tert-butyl peroxy-2-ethylhexanoate and 20.2 parts 2-butoxyethanol was feed over 60 minutes. Once the feed was complete, 38.2 parts 2-butoxyethanol flush was charged into the vessel and the temperature was held for 60 minutes. A chase of 2.4 parts of tert-butyl peroxy-2-ethylhexanoate and 1.5 parts 2-butoxyethanol were added and held for 60 minutes. A second chase of 2.4 parts of tert-butyl peroxy-2-ethylhexanoate and 1.5 parts 2-butoxyethanol were added and held for 60 minutes. A third and final chase of 2.4 parts of tert-butyl peroxy-2-ethylhexanoate and 1.5 parts 2-butoxyethanol were added and held for 60 minutes. The reaction was cooled to room temperature and shut down for the night. The next day the reactor temperature was set to 103° C. and agitation reengaged with the addition of 452.85 parts of Solution Acrylic 1. Along with the Solution Acrylic 1, 20.7 parts n-hexylglycol and 18 parts DI Water. The reflux and nitrogen blanket were reengaged. To the reactor 64.9 parts dimethyl ethanolamine was added over 5 minutes at a reactor temperature of 103° C. and held for 4-hours at temperature. At the end of the hold, 155.6 parts DI water was added over 10 minutes followed by a 60 minute hold. Once the hold was complete, the agitation was increased to 320 rpms and 1836.6 parts DI water was added over 60 minutes. The set point was set to room temperature the system was cooled at the end of the added. Physical Constants: 21.9% non-volatile materials; particle size 0.517µ; viscosity 112 cps @ 80° F., pH 7.28.

Acrylic Dispersion 2 (control): To a 5-liter round bottom flask equipped with a thermocouple, a reflux condenser, nitrogen blanket and a prop mixer, 138.6 parts n-butanol and 104.6 parts 2-butoxyethanol was added. The agitation was engaged, set to total reflux, and nitrogen blanket was activated. The set point for the heat was set to 96° C. At a reactor temperature of 94° C., 7.81 parts of tert-butyl peroxy-2-ethylhexanoate and 1.53 parts 2-butoxyethanol was added and hold for 5 minutes. At the end of the 5 minute hold a dual-simultaneous feed was charged into the vessel over 105 minutes where premix feed 1 is: 443.8 parts styrene, 124.3 parts 2-hydroxypropyl methacrylate, 23.7 parts glycidyl metacrylate, and 35.1 parts 2-butoxyethanol. Premix feed 2 was composed of 24.8 parts of tert-butyl peroxy-2-ethylhexanoate and 20.2 parts 2-butoxyethanol. At the end of the feed time, premix feed 1 was flushed 31.9 parts 2-butoxyethanol while and addition premix of 24.8 parts of tert-butyl peroxy-2-ethylhexanoate and 20.2 parts 2-butoxyethanol was feed over 60 minutes. Once the feed was complete, 38.2 parts 2-butoxyethanol flush was charged into the vessel and the temperature was held for 60 minutes. A chase of 2.4 parts of tert-butyl peroxy-2-ethylhexanoate and 1.5 parts 2-butoxyethanol were added and held for 60 minutes. A second chase of 2.4 parts of tert-butyl peroxy-2-ethylhexanoate and 1.5 parts 2-butoxyethanol were added and held for 60 minutes. A third and final chase of 2.4 parts of tert-butyl peroxy-2-ethylhexanoate and 1.5 parts 2-butoxyethanol were added and held for 60 minutes. The reaction was cooled to room temperature and shut down for the night. The next day the reactor temperature was set to 103° C. and agitation reengaged with the addition of 452.85 parts of Solution Acrylic 1. Along with the Solution Acrylic 1, 20.7 parts n-hexylglycol and 18 parts DI Water. The reflux and nitrogen blanket were reengaged. To the reactor 64.9 parts dimethyl ethanolamine was added over 5 minutes at a reactor temperature of 103° C. and held for 4-hours at temperature. At the end of the hold, 155.6 parts DI water was added over 10 minutes followed by a 60 minute hold. Once the hold was complete, the agitation was increased to 320 rpms and 1836.6 parts DI water was added over 60 minutes. The set point was set to room temperature the system was cooled at the end of the added.

Acrylic Latex 3: To a 5-liter round bottom flask equipped with a thermocouple, a reflux condenser, nitrogen blanket and a prop mixer, 1046.01 parts deionized water, 31.64 parts dimethyl ethanolamine, and 359.36 parts Solution Acrylic 2 was added. The agitation was engaged, set to total reflux, and nitrogen blanket was activated. The set point for the heat was set to 70° C. At a reactor temperature of 70° C., the mixture was hold for 30 minutes. At the end of the hold, 5.07 parts benzoin and 8.14 parts deionized water were added and set point for the heat was set to 81° C. Once the temperature reached 81° C., 5.07 parts 30% hydrogen peroxide and 8.14 parts deionized water were added to the vessel and held for 5 minutes. After the 5 minute hold, a premix of 279.89 parts styrene, 156.64 parts butyl acrylate, 38.52 parts DCPA, and 38.52 parts glycidyl methacrylate were added over 30 minutes. At the end of the feed time, the line was flushed 181.72 parts deionized water. Once flush was complete, 10 minutes hold was initiated. At the end of the 10 minutes hold, a chase of 0.88 parts benzoin, 6.16 parts deionized water, and 0.86 parts 30% hydrogen peroxide was added. A 45 minute hold was initiated. At the end of the hold, a second chase of 0.29 parts benzoin, 6.16 parts deionized water, and 0.29 parts 30% hydrogen peroxide was added followed by a 2 hour hold at temperature. At the end final hold, a chase of 2.77 parts Trigonox A-W70, 19.52 parts deionized water, 1.91 parts erythorbic acid, 2.06 parts dimethyl ethanolamine, 0.38 parts of Iron (II) complex in water were added and cooled to room temperature.

Acrylic Latex 4 (control): To a 5-liter round bottom flask equipped with a thermocouple, a reflux condenser, nitrogen blanket and a prop mixer, 1046.01 parts deionized water, 31.64 parts dimethyl ethanolamine, and 359.36 parts Solution Acrylic 2 was added. The agitation was engaged, set to total reflux, and nitrogen blanket was activated. The set point for the heat was set to 70° C. At a reactor temperature of 70° C., the mixture was hold for 30 minutes. At the end of the hold, 5.07 parts benzoin and 8.14 parts deionized water were added and set point for the heat was set to 81° C. Once the temperature reached 81° C., 5.07 parts 30% hydrogen peroxide and 8.14 parts deionized water were added to the vessel and held for 5 minutes. After the 5 minute hold, a premix of 318.41 parts styrene, 156.64 parts butyl acrylate, and 38.52 parts glycidyl methacrylate were added over 30 minutes. At the end of the feed time, the line was flushed 181.72 parts deionized water. Once flush was complete, 10 minutes hold was initiated. At the end of the 10 minutes hold, a chase of 0.88 parts benzoin, 6.16 parts deionized water, and 0.86 parts 30% hydrogen peroxide was added. A 45 minute hold was initiated. At the end of the hold, a second chase of 0.29 parts benzoin, 6.16 parts deionized water, and 0.29 parts 30% hydrogen peroxide was added followed by a 2 hour hold at temperature. At the end final hold, a chase of 2.77 parts Trigonox A-W70, 19.52 parts deionized water, 1.91 parts erythorbic acid, 2.06 parts dimethyl ethanolamine, 0.38 parts of Iron (II) complex in water were added and cooled to room temperature.

The acrylic acrylate coating compositions were tested using standard panel test methods including the Solvent Resistance Rub Test, as currently found in ASTM D4752, incorporated herein by reference, and referred to in the table as "MEK Double Rubs."

TABLE 1

Formulation and performance data for coatings using DCPA in acrylic polymer in organic solution

| | Control 1 | Control 2 | Control 3 | Variable 1 | Variable 2 | Variable 3 | Variable 4 |
|---|---|---|---|---|---|---|---|
| Acrylic Dispersion 1 | | | | 94.30 wt % | 84.54 wt % | 65.72 wt % | 93.96 wt % |
| Acrylic Dispersion 2 (No DCPA) | 94.17 wt % | 84.21 wt % | 65.83 wt % | | | | |
| Phenolic[1] | | 3.61 wt % | 10.66 wt % | | 3.69 wt % | 10.81 wt % | |
| Borchi Oxycoat 1101 | | | | | | | 0.80 wt % |
| DI Water | 5.24 wt % | 11.19 wt % | 21.17 wt % | 5.29 wt % | 10.77 wt % | 21.14 | 5.24 |
| Solvent[2] | 0.59 wt % | 0.99 wt % | 2.34 wt % | 0.41 wt % | 1.00 wt % | 2.33 wt % | |
| Film weight[3] | 3.8 | 4.0 | 3.9 | 3.7 | 4.0 | 4.0 | 3.6 |
| MEK Double Rubs[4] | 15 | 40 | >100 | 30 | >100 | >100 | 50 |
| MEK Double Rubs[5] | 25 | >100 | >100 | 70 | >100 | >100 | 80 |

[1]Phenolic used Durez ® 34285
[2]Blend of 50/50 n-butanol/2-butoxylethanol
[3]milligram per square inch
[4]Methyl Ethyl Ketone Double Rubs of the cured film at 210 seconds at 425° F. on 0.25 75# CDC ETP steel.
[5]Methyl Ethyl Ketone Double Rubs of the cured film at 10 minutes at 400° F. on 0.25 75# CDC ETP steel.

The latex acrylate coating compositions, in which the styrene-mimicking monomer is an emulsion acrylic, were tested using standard can test methods and were rated according to the adhesion methods set forth above, with 10 being no effects observed, and 0 being failure.

TABLE 2

Formulation and performance data for coatings using DCPA in emulsion polymers

|  | Control 4[6] | Variable 5[6] |
|---|---|---|
| Acrylic Latex 3 |  | 14.59 wt % |
| Acrylic Latex 4 (No DCPA) | 13.11 wt % |  |
| Bakelite ® 6535 | 6.17 wt % | 3.15 wt % |
| Phenolic[7] | 2.30 wt % | 5.04 wt % |
| Agitan 731 | 0.03 wt % | 0.04 wt % |
| Zinc Paste[8] | 0.82 wt % | 0.97 wt % |
| Cymel UF resin | 1.56 wt % |  |
| Acrylic Dispersion 2 | 41.68 wt % | 47.87 wt % |
| Deionized Water | 8.62 wt % | 3.34 wt % |
| Tomato Sauce, 2 weeks @, 120 F[9] | 6.33 | 7.00 |
| Chicken Noodle Soup, 2 weeks @ 120 F[9] | 3.67 | 5.00 |

[6]Film weight is 275 mg/in$^2$
[7]Durez ® 34512 or 34285
[8]Internal
[9]Average rating value of 3 packed, Drawn and Ironed Cans

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. An inside spray coating composition for a food or beverage container, the composition comprising:
  a liquid carrier;
  one or both of a metal drier or a resole phenolic crosslinker; and
  an acrylic copolymer comprising a reaction product of monomers comprising:
    one or more monomers containing one or more cyclic groups and one or more ethylenically-unsaturated groups, at least a portion of such monomers being polycyclic monomers containing ring unsaturation and bridged adjacent rings; and
    one or more other ethylenically-unsaturated monomers;
  wherein the coating composition has an average viscosity ranging from about 5 seconds to about 40 seconds as measured using a Ford Viscosity Cup #4 at 25° C.

2. The inside spray coating composition of claim 1, wherein the composition includes the resole phenolic crosslinker.

3. The inside spray coating composition of claim 1, wherein the polycyclic monomers containing ring unsaturation comprise norbornene (meth)acrylate, tricyclodecenyl (meth)acrylate, octahydronaphthalene (meth)acrylate, norbornene (meth)acrylamide, tricyclodecenyl (meth)acrylamide, octahydronaphthalene (meth)acrylamide, tricyclodecenyl vinyl acetate, norbornene vinyl acetate, octahydronaphthalene vinyl acetate, or a combination thereof.

4. The inside spray coating composition of claim 1, wherein the polycyclic monomers containing ring unsaturation comprise norbornene (meth)acrylate, tricyclodecenyl (meth)acrylate, or a combination thereof.

5. The inside spray coating composition of claim 1, wherein the acrylic copolymer is solution polymerized.

6. The inside spray coating composition of claim 1, wherein the acrylic copolymer is emulsion polymerized.

7. The inside spray coating composition of claim 1, wherein the monomers used to produce the acrylic copolymer are substantially free of each of BPA, PVC, other halogenated monomers, and optionally styrene.

8. The inside spray coating composition of claim 1, wherein the polycyclic monomers containing ring unsaturation constitute less than 50% of the monomers used to produce the acrylic copolymer.

9. The inside spray coating composition of claim 1, wherein the one or more ethylenically-unsaturated monomers constitute at least 3% by weight of the acrylic copolymer, based on the total weight of the monomers used to produce the acrylic copolymer.

10. The inside spray coating composition of claim 1, wherein the one or more other ethylenically-unsaturated monomers comprise one or more oxirane-functional monomers selected from glycidyl acrylate, glycidyl methacrylate, and combinations thereof.

11. The inside spray coating composition of claim 1, wherein the coating exhibits a glass transition temperature ranging from about 50° C. to about 120° C.

12. The inside spray coating composition of claim 1, wherein the liquid carrier comprises water and an organic solvent, and wherein the liquid carrier comprises greater than about 5% of organic solvent.

13. The inside spray coating composition of claim 1, wherein the acrylic copolymer makes up 50% or more by weight of the composition, based on the entire weight of the total resin solids in the coating composition.

14. The inside spray coating composition of claim 1, wherein the reactants used to make the composition are substantially free of monomers having oxirane groups.

15. The inside spray coating composition of claim 1, wherein a cured food or beverage container coating formed from the inside spray coating composition exhibits a global extraction result of less than 50 ppm.

16. The inside spray coating composition of claim 1, wherein the composition includes the metal drier.

17. The inside spray coating composition of claim 16, wherein the metal drier is present in an amount of from about 10 ppm to less than about 10,000 ppm, based on the total weight of metal in the metal direr relative to the total weight of the coating composition.

18. The inside spray coating composition of claim 17, wherein the metal drier comprises aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), or an oxide, salt, or complex of any of these.

19. The inside spray coating composition of claim 1, wherein the polycyclic monomer containing ring unsaturation includes at least one double bond with a heat of hydrogenation greater than that of cyclohexene.

20. The inside spray coating composition of claim 19, wherein the polycyclic monomer containing ring unsaturation includes at least one double bond with a heat of hydrogenation at least about as high as that of bicyclo[2.2.1]heptene.

* * * * *